(12) United States Patent
Splitz et al.

(10) Patent No.: US 8,660,134 B2
(45) Date of Patent: Feb. 25, 2014

(54) SYSTEMS AND METHODS FOR TIME-BASED HAILING OF RADIO FREQUENCY DEVICES

(75) Inventors: David Edwin Splitz, Sandwich, MA (US); William Charles Shoesmith, Marion, MA (US); Robert Henry Grady, Rumford, RI (US)

(73) Assignee: Mueller International, LLC, Atlanta, GA (US)

( * ) Notice: Subject to any disclaimer, the term of this patent is extended or adjusted under 35 U.S.C. 154(b) by 127 days.

(21) Appl. No.: 13/283,526

(22) Filed: Oct. 27, 2011

(65) Prior Publication Data

US 2013/0107772 A1 May 2, 2013

(51) Int. Cl.
*H04J 3/26* (2006.01)

(52) U.S. Cl.
USPC .................. 370/432; 455/456.1; 455/63.1

(58) Field of Classification Search
None
See application file for complete search history.

(56) References Cited

U.S. PATENT DOCUMENTS

| | | |
|---|---|---|
| 1,788,618 A | 1/1931 | Cover |
| 3,254,660 A | 6/1966 | Ray |
| 3,593,957 A | 7/1971 | Dolter |
| 3,705,385 A | 12/1972 | Batz |
| 4,093,997 A | 6/1978 | Germer |
| 4,120,031 A | 10/1978 | Kincheloe et al. |
| 4,291,375 A | 9/1981 | Wolf |
| 4,388,690 A | 6/1983 | Lumsden |
| 4,414,633 A | 11/1983 | Churchill |
| 4,442,492 A | 4/1984 | Karlsson et al. |
| 4,465,970 A | 8/1984 | DiMassimo et al. |
| 4,516,213 A | 5/1985 | Gidden |
| 4,542,469 A | 9/1985 | Brandyberry et al. |
| 4,591,988 A | 5/1986 | Klima et al. |
| 4,707,852 A | 11/1987 | Jahr et al. |
| 4,727,900 A | 3/1988 | Dooling et al. |
| 4,792,946 A | 12/1988 | Mayo |
| 4,803,632 A | 2/1989 | Frew et al. |
| 4,833,618 A | 5/1989 | Verma et al. |
| 4,868,566 A | 9/1989 | Strobel et al. |
| 4,881,070 A | 11/1989 | Burrowes et al. |
| 4,940,976 A | 7/1990 | Gastouniotis et al. |
| 4,967,996 A | 11/1990 | Sonoda et al. |
| 5,056,107 A | 10/1991 | Johnson et al. |
| 5,075,792 A | 12/1991 | Brown et al. |
| 5,079,715 A | 1/1992 | Venkataraman et al. |
| 5,239,575 A | 8/1993 | White et al. |
| 5,251,480 A | 10/1993 | Brunson et al. |

(Continued)

FOREIGN PATENT DOCUMENTS

| | | |
|---|---|---|
| CA | 2476119 | 2/2005 |
| CN | 1185838 | 6/1998 |

(Continued)

OTHER PUBLICATIONS

Keyghobad, Seyamak; Non-Final Office Action for U.S. Appl. No. 13/372,408, filed Feb. 13, 2012, mailed May 25, 2012; 17 pgs.

(Continued)

*Primary Examiner* — Robert Wilson
(74) *Attorney, Agent, or Firm* — Taylor English Duma LLP

(57) ABSTRACT

The present disclosure relates to systems and methods for communicating with a radio frequency (RF) device. An exemplary method includes: sending to the RF device a hailing signal based on a system time; and sending to the RF device a data message.

5 Claims, 11 Drawing Sheets

(56) References Cited

U.S. PATENT DOCUMENTS

| | | |
|---|---|---|
| 5,267,587 A | 12/1993 | Brown |
| 5,298,894 A | 3/1994 | Cerny et al. |
| 5,381,136 A | 1/1995 | Powers et al. |
| 5,434,911 A | 7/1995 | Gray et al. |
| 5,438,329 A * | 8/1995 | Gastouniotis et al. ... 340/870.02 |
| 5,451,938 A | 9/1995 | Brennan |
| 5,459,459 A | 10/1995 | Lee, Jr. |
| 5,481,259 A | 1/1996 | Bane |
| 5,493,287 A | 2/1996 | Bane |
| 5,519,387 A | 5/1996 | Besier et al. |
| 5,525,898 A | 6/1996 | Lee et al. |
| 5,553,094 A | 9/1996 | Johnson et al. |
| 5,590,179 A | 12/1996 | Shincovich et al. |
| 5,594,740 A | 1/1997 | LaDue |
| 5,594,776 A * | 1/1997 | Dent .......................... 455/458 |
| 5,617,084 A | 4/1997 | Sears |
| 5,631,554 A | 5/1997 | Briese et al. |
| 5,666,655 A * | 9/1997 | Ishikawa et al. .............. 455/512 |
| 5,673,252 A | 9/1997 | Johnson et al. |
| 5,708,195 A | 1/1998 | Kurisu et al. |
| 5,714,931 A | 2/1998 | Petitie et al. |
| 5,748,104 A | 5/1998 | Argyroudis et al. |
| 5,751,797 A | 5/1998 | Saadeh |
| 5,801,643 A | 9/1998 | Williams et al. |
| 5,815,086 A | 9/1998 | Ivie et al. |
| 5,852,658 A | 12/1998 | Knight et al. |
| 5,877,703 A | 3/1999 | Bloss et al. |
| 5,892,441 A | 4/1999 | Woolley et al. |
| 5,892,758 A | 4/1999 | Argyroudis |
| 5,907,491 A | 5/1999 | Canada et al. |
| 5,924,051 A | 7/1999 | Provost et al. |
| 5,926,103 A | 7/1999 | Petite |
| 5,926,531 A | 7/1999 | Petite |
| 5,940,009 A | 8/1999 | Loy et al. |
| 5,963,146 A | 10/1999 | Johnson et al. |
| 5,963,557 A * | 10/1999 | Eng ............................. 370/432 |
| 5,971,011 A | 10/1999 | Price |
| 5,979,863 A | 11/1999 | Lousberg |
| 5,986,573 A | 11/1999 | Franklin et al. |
| 5,994,892 A | 11/1999 | Turino et al. |
| 6,006,212 A | 12/1999 | Schleich et al. |
| 6,028,522 A | 2/2000 | Petitie |
| 6,028,855 A * | 2/2000 | Hirsch ......................... 370/350 |
| 6,031,455 A | 2/2000 | Grube et al. |
| 6,031,466 A | 2/2000 | Leshets et al. |
| 6,044,062 A | 3/2000 | Brownrigg et al. |
| 6,058,374 A | 5/2000 | Guthrie et al. |
| 6,060,994 A | 5/2000 | Chen |
| 6,069,571 A | 5/2000 | Tell |
| 6,081,204 A | 6/2000 | Lavoie et al. |
| 6,150,955 A | 11/2000 | Tracy et al. |
| 6,152,173 A | 11/2000 | Makowan |
| 6,163,276 A | 12/2000 | Irving et al. |
| 6,172,616 B1 | 1/2001 | Johnson et al. |
| 6,195,018 B1 | 2/2001 | Ragle et al. |
| 6,218,953 B1 | 4/2001 | Petite |
| 6,233,327 B1 | 5/2001 | Petitie |
| 6,246,677 B1 | 6/2001 | Nap et al. |
| 6,249,516 B1 | 6/2001 | Brownrigg et al. |
| 6,288,641 B1 | 9/2001 | Casais |
| 6,317,051 B1 | 11/2001 | Cohen |
| 6,333,975 B1 | 12/2001 | Brunn et al. |
| 6,373,399 B1 | 4/2002 | Johnson et al. |
| 6,392,538 B1 | 5/2002 | Shere |
| 6,405,047 B1 * | 6/2002 | Moon ........................ 455/456.1 |
| 6,424,270 B1 | 7/2002 | Ali |
| 6,430,268 B1 | 8/2002 | Petite |
| 6,437,692 B1 | 8/2002 | Petite et al. |
| 6,453,247 B1 | 9/2002 | Hunaidi |
| 6,470,903 B2 | 10/2002 | Reyman |
| 6,493,377 B2 | 12/2002 | Schilling et al. |
| 6,512,463 B1 | 1/2003 | Campbell et al. |
| 6,528,957 B1 | 3/2003 | Luchaco |
| 6,538,577 B1 | 3/2003 | Ehrke et al. |
| 6,560,543 B2 | 5/2003 | Wolfe et al. |
| 6,564,159 B1 | 5/2003 | Lavoie et al. |
| 6,577,961 B1 | 6/2003 | Hubbard et al. |
| 6,618,578 B1 | 9/2003 | Petite |
| 6,624,750 B1 | 9/2003 | Marman et al. |
| 6,628,207 B1 | 9/2003 | Hemminger et al. |
| 6,628,764 B1 | 9/2003 | Petite |
| 6,633,781 B1 | 10/2003 | Lee et al. |
| 6,653,945 B2 | 11/2003 | Johnson et al. |
| 6,657,552 B2 | 12/2003 | Belski et al. |
| 6,675,071 B1 | 1/2004 | Griffin, Jr. et al. |
| 6,677,861 B1 | 1/2004 | Henry et al. |
| 6,701,956 B1 | 3/2004 | Berger |
| 6,710,721 B1 | 3/2004 | Holowick |
| 6,747,557 B1 | 6/2004 | Petite et al. |
| 6,798,352 B2 | 9/2004 | Holowick |
| 6,836,737 B2 | 12/2004 | Petite et al. |
| 6,847,300 B2 | 1/2005 | Yee et al. |
| 6,891,838 B1 | 5/2005 | Petite et al. |
| 6,914,533 B2 | 7/2005 | Petite |
| 6,914,893 B2 | 7/2005 | Petite |
| 6,931,445 B2 | 8/2005 | Davis |
| 6,946,972 B2 | 9/2005 | Mueller et al. |
| 6,954,701 B2 | 10/2005 | Wolfe |
| 6,954,814 B1 | 10/2005 | Leach |
| 6,978,210 B1 | 12/2005 | Suter et al. |
| 6,980,079 B1 | 12/2005 | Shintani et al. |
| 7,008,239 B1 | 3/2006 | Ju |
| 7,009,530 B2 | 3/2006 | Zigdon et al. |
| 7,012,546 B1 | 3/2006 | Zigdon et al. |
| 7,042,368 B2 | 5/2006 | Patterson et al. |
| 7,053,767 B2 | 5/2006 | Petite et al. |
| 7,054,271 B2 | 5/2006 | Brownrigg |
| 7,061,924 B1 | 6/2006 | Durrant et al. |
| 7,072,945 B1 | 7/2006 | Nieminen |
| 7,079,810 B2 | 7/2006 | Petite |
| 7,088,239 B2 | 8/2006 | Basinger et al. |
| 7,089,125 B2 | 8/2006 | Sonderegger |
| 7,099,781 B1 | 8/2006 | Heidl et al. |
| 7,103,511 B2 | 9/2006 | Petite |
| 7,111,817 B2 | 9/2006 | Teti et al. |
| 7,117,051 B2 | 10/2006 | Landry |
| 7,123,628 B1 | 10/2006 | Hwang |
| 7,124,184 B2 | 10/2006 | Chung et al. |
| 7,137,550 B1 | 11/2006 | Petite |
| 7,142,107 B2 | 11/2006 | Kates |
| 7,248,181 B2 | 7/2007 | Patterson et al. |
| 7,256,704 B2 | 8/2007 | Yoon et al. |
| 7,263,073 B2 | 8/2007 | Petite |
| 7,272,635 B1 | 9/2007 | Longtin et al. |
| 7,292,143 B2 | 11/2007 | Drake et al. |
| 7,295,128 B2 | 11/2007 | Petite |
| 7,301,456 B2 | 11/2007 | Han |
| 7,315,257 B2 | 1/2008 | Patterson et al. |
| 7,342,504 B2 | 3/2008 | Crane et al. |
| 7,346,030 B2 | 3/2008 | Cornwall |
| 7,349,766 B2 | 3/2008 | Rodgers |
| 7,353,280 B2 | 4/2008 | Chiles et al. |
| 7,356,614 B2 | 4/2008 | Kim et al. |
| 7,363,031 B1 | 4/2008 | Aisa |
| 7,385,524 B1 | 6/2008 | Orlosky |
| 7,397,907 B2 | 7/2008 | Petite |
| 7,417,557 B2 | 8/2008 | Osterloh et al. |
| 7,423,985 B1 | 9/2008 | Hill |
| 7,424,527 B2 | 9/2008 | Petite |
| 7,443,313 B2 | 10/2008 | Davis et al. |
| 7,444,401 B1 | 10/2008 | Keyghobad et al. |
| 7,453,373 B2 | 11/2008 | Cumeralto et al. |
| 7,468,661 B2 | 12/2008 | Petite et al. |
| 7,478,108 B2 | 1/2009 | Townsend et al. |
| 7,480,501 B2 | 1/2009 | Petite |
| 7,526,539 B1 | 4/2009 | Hsu |
| 7,533,693 B2 | 5/2009 | Colton et al. |
| 7,650,425 B2 | 1/2010 | Davis |
| 7,697,492 B2 | 4/2010 | Petite |
| 7,739,378 B2 | 6/2010 | Petite |
| 7,746,246 B2 | 6/2010 | Salser |
| 7,752,309 B2 | 7/2010 | Keyghobad et al. |
| 7,756,086 B2 | 7/2010 | Petite |
| 7,783,738 B2 | 8/2010 | Keyghobad et al. |

(56) References Cited

U.S. PATENT DOCUMENTS

| | | | |
|---|---|---|---|
| 7,792,946 B2 | 9/2010 | Keyghobad et al. | |
| 7,843,379 B2 * | 11/2010 | Menzer et al. | 342/118 |
| 7,880,641 B2 | 2/2011 | Parris et al. | |
| 7,962,101 B2 * | 6/2011 | Vaswani et al. | 455/67.11 |
| 7,980,317 B1 | 7/2011 | Preta et al. | |
| 8,109,131 B2 | 2/2012 | Winter | |
| 8,140,667 B2 | 3/2012 | Keyghobad et al. | |
| 8,249,042 B2 | 8/2012 | Sparr et al. | |
| 8,300,626 B2 | 10/2012 | Thubert et al. | |
| 8,351,409 B2 | 1/2013 | Albert et al. | |
| 8,391,177 B2 | 3/2013 | Picard | |
| 8,407,333 B2 | 3/2013 | Keyghobad et al. | |
| 8,549,131 B2 | 10/2013 | Keyghobad et al. | |
| 2001/0010032 A1 | 7/2001 | Ehlers et al. | |
| 2001/0024163 A1 | 9/2001 | Petite | |
| 2001/0048030 A1 | 12/2001 | Sharood | |
| 2002/0013679 A1 | 1/2002 | Petite | |
| 2002/0019725 A1 | 2/2002 | Petite | |
| 2002/0031101 A1 | 3/2002 | Petite | |
| 2002/0051546 A1 | 5/2002 | Bizjak | |
| 2002/0062392 A1 | 5/2002 | Nishikawa | |
| 2002/0067717 A1 | 6/2002 | Raschke | |
| 2002/0073183 A1 | 6/2002 | Yoon | |
| 2002/0089802 A1 | 7/2002 | Beckwith | |
| 2002/0130768 A1 | 9/2002 | Che et al. | |
| 2002/0169643 A1 | 11/2002 | Petite | |
| 2002/0190956 A1 | 12/2002 | Klein | |
| 2003/0009515 A1 | 1/2003 | Lee | |
| 2003/0018733 A1 | 1/2003 | Yoon | |
| 2003/0018776 A1 | 1/2003 | Yoon | |
| 2003/0036810 A1 | 2/2003 | Petite | |
| 2003/0046377 A1 | 3/2003 | Daum | |
| 2003/0074109 A1 | 4/2003 | Jeong | |
| 2003/0107485 A1 | 6/2003 | Zoratti | |
| 2004/0010561 A1 | 1/2004 | Kim et al. | |
| 2004/0054747 A1 | 3/2004 | Breh et al. | |
| 2004/0129312 A1 | 7/2004 | Cuzzo et al. | |
| 2004/0139210 A1 | 7/2004 | Lee et al. | |
| 2004/0158333 A1 | 8/2004 | Ha et al. | |
| 2004/0183687 A1 | 9/2004 | Petite | |
| 2005/0067022 A1 | 3/2005 | Istre | |
| 2005/0078631 A1 | 4/2005 | Cornwell | |
| 2005/0096753 A1 | 5/2005 | Arling | |
| 2005/0104747 A1 | 5/2005 | Silic et al. | |
| 2005/0121880 A1 | 6/2005 | Santangelo | |
| 2005/0159823 A1 | 7/2005 | Hayes | |
| 2005/0190784 A1 | 9/2005 | Stine | |
| 2005/0195768 A1 | 9/2005 | Petite | |
| 2005/0195775 A1 | 9/2005 | Petite | |
| 2005/0201379 A1 | 9/2005 | Zhang | |
| 2005/0201397 A1 | 9/2005 | Petite | |
| 2005/0203647 A1 | 9/2005 | Landry | |
| 2006/0028355 A1 | 2/2006 | Patterson et al. | |
| 2006/0041655 A1 | 2/2006 | Holloway | |
| 2006/0098576 A1 | 5/2006 | Brownrigg | |
| 2006/0158347 A1 | 7/2006 | Roche et al. | |
| 2006/0201550 A1 | 9/2006 | Blyth et al. | |
| 2006/0218266 A1 | 9/2006 | Matsumoto et al. | |
| 2006/0273896 A1 | 12/2006 | Kates | |
| 2007/0059986 A1 | 3/2007 | Rockwell | |
| 2007/0063866 A1 | 3/2007 | Webb | |
| 2007/0091825 A1 | 4/2007 | Budampati et al. | |
| 2007/0284293 A1 | 12/2007 | Pitchford et al. | |
| 2007/0293221 A1 * | 12/2007 | Hwang et al. | 455/435.1 |
| 2007/0298779 A1 | 12/2007 | Wolman et al. | |
| 2008/0030319 A1 | 2/2008 | McKenna et al. | |
| 2008/0061769 A1 | 3/2008 | Junk et al. | |
| 2008/0095403 A1 | 4/2008 | Benhammou | |
| 2008/0109090 A1 | 5/2008 | Esmaili et al. | |
| 2008/0149180 A1 | 6/2008 | Parris et al. | |
| 2008/0186898 A1 | 8/2008 | Petite | |
| 2008/0189056 A1 | 8/2008 | Heidl et al. | |
| 2008/0281534 A1 | 11/2008 | Hurley | |
| 2008/0291054 A1 | 11/2008 | Groft | |
| 2009/0058676 A1 | 3/2009 | Orlosky | |
| 2009/0068947 A1 | 3/2009 | Petite | |
| 2009/0121860 A1 | 5/2009 | Kimmel et al. | |
| 2009/0133887 A1 | 5/2009 | Garcia et al. | |
| 2009/0153357 A1 | 6/2009 | Bushman et al. | |
| 2009/0215424 A1 | 8/2009 | Petite | |
| 2009/0243840 A1 | 10/2009 | Petite | |
| 2009/0255346 A1 | 10/2009 | Hendey et al. | |
| 2009/0287838 A1 | 11/2009 | Keyghobad | |
| 2009/0301571 A1 | 12/2009 | Ruhs | |
| 2009/0309755 A1 | 12/2009 | Williamson et al. | |
| 2010/0017465 A1 | 1/2010 | Brownrigg | |
| 2010/0039984 A1 | 2/2010 | Brownrigg | |
| 2010/0156632 A1 | 6/2010 | Hyland et al. | |
| 2010/0194582 A1 | 8/2010 | Petite | |
| 2010/0250054 A1 | 9/2010 | Petite | |
| 2010/0265909 A1 | 10/2010 | Petite | |
| 2010/0295672 A1 | 11/2010 | Hyland et al. | |
| 2010/0312881 A1 | 12/2010 | Davis | |
| 2010/0329232 A1 | 12/2010 | Tubb et al. | |
| 2011/0018762 A1 * | 1/2011 | Walley et al. | 342/357.62 |
| 2011/0044276 A1 | 2/2011 | Albert et al. | |
| 2011/0140909 A1 | 6/2011 | Olson et al. | |
| 2012/0106518 A1 | 5/2012 | Albert et al. | |
| 2012/0271686 A1 | 10/2012 | Silverman | |
| 2013/0083722 A1 | 4/2013 | Bhargava et al. | |
| 2013/0094537 A1 * | 4/2013 | Hui et al. | 375/134 |
| 2013/0107772 A1 * | 5/2013 | Splitz et al. | 370/311 |
| 2013/0109319 A1 * | 5/2013 | Splitz et al. | 455/63.1 |

FOREIGN PATENT DOCUMENTS

| | | |
|---|---|---|
| GB | 2305333 | 4/1997 |
| JP | 62-295674 | 12/1987 |
| JP | 06-223279 | 8/1994 |
| JP | 6300606 | 10/1994 |
| JP | 07-116285 | 5/1995 |
| JP | 07231363 | 8/1995 |
| JP | 2000285356 | 10/2000 |
| JP | 2008198044 | 8/2008 |
| JP | 2012507090 | 3/2012 |
| JP | 2012527706 | 11/2012 |
| JP | 2013528732 | 7/2013 |
| WO | 9810299 | 3/1998 |
| WO | 9810394 | 3/1998 |
| WO | 2008087911 | 7/2008 |
| WO | 2010051287 | 5/2010 |
| WO | 2010135587 | 11/2010 |
| WO | 2011159403 | 12/2011 |

OTHER PUBLICATIONS

Keyghobad, Seyamak; U.S. Patent Application entitled: Method and Apparatus for Inexpensively Monitoring and Controlling Remotely Distributed Appliances for U.S. Appl. No. 13/548,914, filed Aug. 21, 2012, 25 pgs.

Hyland; International Preliminary Report on Patentability for serial No. PCT/US2009/062247, filed Oct. 27, 2009, mailed May 3, 2011, 7 pgs.

Keyghobad, Seyamak; Non-Final Office Action for U.S. Appl. No. 13/590,954, filed Aug. 21, 2012, mailed Dec. 13, 2012; 39 pgs.

Keyghobad, Seyamak; U.S. Patent Application entitled: Method and Apparatus for Inexpensively Monitoring and Controlling Remotely Distributed Appliances for U.S. Appl. No. 13/590,954, filed Aug. 21, 2012, 25 pgs.

Mexico Office Action for serial No. MX/a/2011/004330, filed Apr. 25, 2011, mailed Mar. 21, 2013, 4 pgs.

Keyghobad, Seyamak; Notice of Allowance for U.S. Appl. No. 13/590,954, filed Aug. 21, 2012, mailed Mar. 21, 2013, 22 pgs.

Hyland, Gregory E.; Final Office Action for U.S. Appl. No. 12/606,957, filed Oct. 27, 2009, mailed Apr. 10, 2013, 80 pgs.

Keyghobad, Seyamak; Issue Notification for U.S. Appl. No. 10/298,300, filed Nov. 18, 2002 mailed Oct. 8, 2008; 1 pg.

Keyghobad, Seyamak; Issue Notification for U.S. Appl. No. 12/243,452, filed Oct. 1, 2008 mailed Jun. 16, 2010; 1 pg.

Keyghobad, Seyamak; Issue Notification for U.S. Appl. No. 12/490,925, filed Jun. 24, 2009; mailed Aug. 18, 2010; 1 pg.

(56) References Cited

OTHER PUBLICATIONS

Keyghobad, Seyamak; Issue Notification for U.S. Appl. No. 12/490,957, filed Jun. 24, 2009; mailed Aug. 4, 2010; 1 pg.

Keyghobad, Seyamak; U.S. Patent Application Entitled: Method and Apparatus for Inexpensively Monitoring and Controlling Remotely Distributed Appliances under U.S. Appl. No. 12/490,957, filed Jun. 24, 2009, 33 pgs.

Keyghobad, Seyamak; U.S. Patent Application Entitled: Method and Apparatus for Inexpensively Monitoring and Controlling Remotely Distributed Appliances under U.S. Appl. No. 12/490,867, filed Jun. 24, 2009; 33 pgs.

Keyghobad, Seyamak; Non Final Rejection for U.S. Appl. No. 12/490,867, filed Jun. 24, 2009, mailed Oct. 4, 2010; 13 pgs.

Keyghobad, Seyamak; Non Final Rejection for U.S. Appl. No. 12/490,867, filed Jun. 24, 2009, mailed Mar. 21, 2011; 9 pgs.

Keyghobad, Seyamak; Notice of Allowance for U.S. Appl. No. 12/490,867, filed Jun. 24, 2006, mailed Sep. 7, 2011; 6 pgs.

Keyghobad, Seyamak; Notice of Allowance for U.S. Appl. No. 12/490,867, filed Jun. 24, 2009, mailed Nov. 2, 2011; 17 pgs.

Ball, Marty Scott; U.S. Patent Application Entitled: Valve Meter Assembly and Method under U.S. Appl. No. 13/149,720, filed May 31, 2011; 56 pgs.

Keyghobad, Seyamak; U.S. Patent Application Entitled: Method and Apparatus for Inexpensively Monitoring and Controlling Remotely Distributed Appliances under U.S. Appl. No. 13/372,408, filed Feb. 13, 2012; 34 pgs.

Keyghobad, Seyamak; Examiner Interview Summary Record for U.S. Appl. No. 10/298,300, filed Nov. 18, 2002; mailed Feb. 5, 2008; 2 pages.

Keyghobad, Seyamak; Non-Final Rejection for U.S. Appl. No. 10/298,300, filed Nov. 18, 2002; mailed Oct. 26, 2007; 36 pages.

Keyghobad, Seyamak; Requirement for Restriction/ Election for U.S. Appl. No. 10/298,300, filed Nov. 18, 2002; mailed Feb. 27, 2006; 17 pages.

Keyghobad,Seyamak; U.S. Patent Application entitled: Method and Apparatus for Inexpensively Monitoring and Controlling Remotely Distributed Appliances under U.S. Appl. No. 10/298,300, filed Nov. 18, 2002; 40 pages.

Keyghobad, Seyamak; Notice of Allowance for U.S. Appl. No. 12/243,452, filed Oct. 1, 2008; mailed Mar. 22, 2010; 8 pages.

Keyghobad, Seyamak; Examiner Interview Summary Record for U.S. Appl. No. 12/243,452, filed Oct. 1, 2008; mailed Dec. 7, 2009; 3 pages.

Keyghobad, Seyamak; Non-Final Rejection for U.S. Appl. No. 12/243,452, filed Oct. 1, 2008; mailed Sep. 14, 2009; 12 pages.

Keyghobad,Seyamak; Non-Final Rejection for U.S. Appl. No. 12/243,452, filed Oct. 1, 2008; mailed May 1, 2009; 5 pages.

Keyghobad, Seyamak; Notice of Allowance for U.S. Appl. No. 12/490,925, filed Jun. 24, 2009; mailed Aug. 2, 2010; 6 pgs.

Keyghobad, Seyamak; Notice of Allowance for U.S. Appl. No. 12/490,925, filed Jun. 24, 2009; mailed Jul. 19, 2010; 9 pages.

Keyghobad, Seyamak; Notice of Allowance for U.S. Appl. No. 12/490,925, filed Jun. 24, 2009; mailed Jun. 28, 2010; 10 pgs.

Keyghobad, Seyamak; Non-Final Rejection for U.S. Appl. No. 12/490,925, filed Jun. 24, 2009; mailed Dec. 23, 2009; 12 pgs.

Keyghobad, Seyamak; Notice of Allowance for U.S. Appl. No. 12/490,957, filed Jun. 24, 2009; mailed Jun. 24, 2010; 10 pgs.

Keyghobad,Seyamak; Non-Final Rejection for U.S. Appl. No. 12/490,957, filed Jun. 24, 2009; mailed Dec. 23, 2009; 17 pgs.

Keyghobad, Seyamak; U.S. Patent Application Entitled: Method and Apparatus for Inexpensively Monitoring and Controlling Remotely Distributed Appliancesl under U.S. Appl. No. 12/243,452, filed Oct. 1, 2008; 33 pages.

Keyghobad, Seyamak; U.S. Patent Application Entitled: Method and Apparatus for Inexpensively Monitoring and Controlling Remotely Distributed Appliances under U.S. Appl. No. 12/490,925, filed Jun. 24, 2009; 33 pgs.

Keyghobad, Seyamak; Non-Final Rejection for U.S. Appl. No. 10/298,300, filed Nov. 18, 2002; mailed May 18, 2006; 14 pages.

Keyghobad, Seyamak; Non-Final Rejection or U.S. Appl. No. 10/298,300, filed Nov. 18, 2002; mailed Jun. 6, 2007; 33 pages.

Keyghobad, Seyamak; Certificate of Correction for U.S. Appl. No. 10/298,300, filed Nov. 18, 2002; mailed Mar. 31, 2009; 1 page.

Keyghobad, Seyamak; Notice of Allowance for U.S. Appl. No. 10/298,300, filed Nov. 18, 2002; mailed Jul. 14, 2008; 6 pages.

Keyghobad, Seyamak; Non-final Office Action for U.S. Appl. No. 13/372,408, filed Feb. 23, 2012; mailed May 25, 2012; 10 pgs.

Splitz; U.S. Patent Application Entitled: Systems and Methods for Time-Based Hailing of Radio Frequency Devices assigned U.S. Appl. No. 13/339,655, filed Dec. 29, 2011; 50 pgs.

Hyland; U.S. Patent Application Entitled: Infrastructure Monitoring Devices, Systems and Methods under U.S. Appl. No. 13/101,235, filed May 5, 2011; 28 pgs.

Hyland; International Search Report and Written Opinion for serial No. PCT/US2009/062247, filed Oct. 27, 2009, mailed Dec. 18, 2009; 2 pages.

Keyghobad, Seyamak; Issue Notification for U.S. Appl. No. 12/490,867, filed Jun. 24, 2009, mailed Feb. 29, 2012; 1 pg.

Splitz, David; International Search Report and Written Opinion for serial No. PCT/US11/58260, filed Oct. 28, 2011, mailed Feb. 7, 2012, 3 pgs.

Splitz, David; International Search Report and Written Opinion for serial No. PCT/US12/22060, filed Jan. 20, 2012, mailed Mar. 29, 2012, 8 pgs.

Hyland; International Search Report and Written Opinion for serial No. PCT/US11/035374, filed May 5, 2011, mailed Sep. 13, 2011; 7 pgs.

Hyland; PCT Application Entitled: Infrastructure Monitoring Devices, Systems, and Methods having serial No. PCT/US11/35374, filed May 5, 2011, 24 pgs.

Splitz, David; PCT Application entitled: Systems and Methods for Dynamic Squelching in Radio Frequency Devices having serial No. PCT/US12/022060, filed Jan. 20, 2012, 39 pgs.

Splitz, David; PCT Application entitled: Systems and Methods for Time-Based Flailing of Radio Frequency having serial No. PCT/US11/058260, filed Oct. 28, 2011, 51 pgs.

Hyland; PCT Appplication entitled: Infrastructure Monitoring Devices, Systems, and Methods having serial No. PCT/US10/35666, filed May 20, 2010; 31 pgs.

Hyland; International Search Report and Written Opinion for serial No. PCT/US10/035666, filed May 20, 2010, mailed Jul. 16, 2010, 2 pgs.

Keyghobad, Seyamak; Notice of Allowance for U.S. Appl. No. 13/372,408, filed Feb. 13, 2012, mailed Jul. 27, 2012; 11 pgs.

Keyghobad, Seyamak; Supplemental Notice of Allowance for U.S. Appl. No. 13/372,408, filed Feb. 13, 2012; mailed Aug. 2, 2012; 7 pgs.

Hyland, Gregory E.; Non-Final Office Action for U.S. Appl. No. 12/784,300, filed May 20, 2010, mailed Sep. 10, 2012.

Young et al. "Real-Time Intranet-Controlled Virtual Instrument Multiple-Circuit Power Monitoring," IEEE Transactions on Instrumentation and Measurement, Jun. 2000. vol. 49, No. 3, pp. 579-583. [Accessed Dec. 29, 2011] http://ieeexplore.ieee.org/xpls/abs_all.jsp?

De Almeida et al. "Advanced Monitoring Technologies for the Evaluation of Demand-Side Management Programs," IEEE Transactions on Power Systems, Aug. 1994. vol. 9, No. 3 [Accessed Dec. 29, 2011] http://ieeexplore.ieee.org/xpls/abs_all.jsp?arnumber=336086, pp. 1691-1697.

Dolezilek. "Microprocessor Based Relay Information Improves the Power System," Rural Electric Power Conference, May 1999. p. B5/1-B5/9. [Dec. 29, 2011] http://ieeexplore.ieee.org/xpls/abs_all.jsp? arnumber=768685.

Gehami et al. "Electronic Control System I Salient Feature in Substation," Transmission & Distrubition, Mar. 1991. vol. 43, No. 3, [Accessed Dec. 29, 2011—ProQuest], pp. 48-51.

Horlent. "New Metering and Reading Techniques Based on a Modular Design Concept," 10th International Conference on Electricity Distribution, May 1989. vol. 5, p. 455-459 [Accessed Dec. 29, 2011—IEEExplore].

"In Brief," Land Mobile Radio News, Jan. 16, 1998. vol. 52, No. 3, [Accessed Dec. 29, 2011—ProQuest] http://proquest.umi.com/

(56) References Cited

OTHER PUBLICATIONS pqdweb?did=25435781&sid=1&Fmt=3&clientId=31810 &RQT=309&VName%20=PQD, pp. 1-3.
"Landis & Gyr Utilities: Service Partnership Helps Utilities Use Available Resources More Effectively," www.landisgyr.com/utilities/e/fr_press1_e.htm (Feb. 6, 1998) http://web.archive.org/web/19980206060801/http://www.landisgyr.com/utilities, pp. 1-5.
Hyland; PCT Application entitled: Infrastructure Monitoring System and Method having serial No. PCT/US09/62247, filed Oct. 27, 2009, 30 pgs.
Tamarkin. "Automated Meter Reading", Sep.-Oct. 1192, vol. 50, No. 5/ [Dec. 29, 2011] http://www.usclcorp.com/news/Automatic_Power_reading.pdf, pp. 1-7.
ANSI; "Protocol Specification for ANSI Type 2 Optical Port", American National Standard, ANSI C.12.18-2006, 11 pgs.
Federal Communications Commission; "Understanding the FCC Regulations for Low-Power, Non-Licensed Transmitters", Office of Engineering and Technology; Oct. 1993; 34 pgs.
Semtech; "TN1200A, Calculating Radiated Power and Field Strength for Conducted Power Measurements", Semtech Corporation, Camarillo, CA, 2007, 9 pgs.
RFM; "HX 2000 Datasheet: 916.5 MHz: Hybrid Transmitter", RF Monolithics, Inc., Dallas, TX, USA, 1998; 2 pgs.
General Electric; "GEH-5081 kV Meter Product Manual", Nov. 1997, 137 pgs.
General Electric; "kV RSX—RS232/RS485 Communications Options: Instructions Manual"; Mar. 1999, 33 pgs.
Orfield; "Badger® Orion® System Helps Lemmon, South Dakota Reduce Read Time, Billing Cycles", Badger Connect Publication, 2004, 2 pgs.
AMCO; "Pit Water-Meter Transponder (PWT)"; AMCO Automated Systems, LLC; PDB-14611; Sep. 2002; 2 pgs.
AMCO; "Short-Range Programmer (SRP) VRT"; AMCO Automated Systems, LLC; PDB-14555.1; Sep. 2002; 2 pgs.
AMCO; Remote Water-Meter Transponder (RWT); AMCO Automated Systems, LLC; PDB-14610; Sep. 2002; 2 pgs.
Article entitled: "Remote Meter Reading", http://www.meter.co.uk/RMR.html; Jul. 30, 2012, 2 pgs.
Article entitled: "Datamatic, Badger Connect for AMR Solutions", http://www.datamatic.com/badger_partnership.html; accessed on Jul. 27, 2012, 1 pg.
Article entitled: "OET Exhibits List", https://apps.fcc.gov/oetcf/eas/reports/ViewExhibitReport.cfm? mode=Exhibits&RequestTimeout=500&calledFromFrame=N&application_id=194044 &fcc_id=; 2 pgs, Jul. 2012.
Hyland, Gregory E.; Non-Final Office Action for U.S. Appl. No. 12/606,957, filed Oct. 27, 2009, mailed Oct. 18, 2012; 44 pgs.
Hyland; U.S. Provisional Patent Application entitled: Infrastructure Monitoring Devices, Systems, and Methods, having U.S. Appl. No. 61/355,468, filed Jun. 16, 2010; 31 pgs.
Hyland; U.S. Provisional Patent Application entitled: Water Supply Infrastructure Monitoring System and Method, having U.S. Appl. No. 61/108,770, filed Oct. 27, 2008, 11 pgs.
Hyland; U.S. Provisional Patent Application entitled: Water Supply Infrastructure Monitoring System and Method, having U.S. Appl. No. 61/180,600, filed May 22, 2009, 14 pgs.
Hyland; U.S. Patent Application entitled: Infrastructure Monitoring System and Method, having U.S. Appl. No. 12/606,957, filed Oct. 27, 2009, 30 pgs.
Hyland; U.S. Application entitled: Infrastructure Monitoring Devices, Systems, and Methods, having U.S. Appl. No. 12/784,300, filed May 20, 2010, 32 pgs.
Keyghobad, Seyamak; Requirement for Restriction/ Election for U.S. Appl. No. 10/298,300, filed Nov. 18, 2002; mailed Feb. 9, 2006; 11 pages.
Keyghobad, Seyamak; Notice of Allowance for U.S. Appl. No. 13/372,408, filed Feb. 13, 2012; mailed Nov. 1, 2012; 18 pgs.
European Search Report for serial No. EP2433440, filed Nov. 18, 2011, mailed Nov. 21, 2012, 6 pgs.
Mexico Office Action for serial No. MX/A/2011/01283, filed May 20, 2010, mailed Nov. 21, 2012, 3 pgs.
Hyland; International Search Preliminary Report on Patentability for serial No. PCT/US11/035374, filed May 5, 2011, mailed Dec. 19, 2012; 5 pgs.
Keyghobad, Seyamak; Non-Final Office Action for U.S. Appl. No. 13/548,914, filed Aug. 21, 2012, mailed Dec. 13, 2012; 39 pgs.
Patterson, Tim; Request for Ex Parte Reexamination under U.S. Appl. No. 90/012,468, filed Sep. 6, 2012; 52 pgs.
Patterson, Tim; Request for Ex Parte Reexamination under U.S. Appl. No. 90/012,449, filed Aug. 23, 2012; 51 pgs.
Hyland; European Search Report for serial No. EP09824079.9, filed Oct. 27, 2009, mailed May 8, 2012; 38 pages.
Keyghobad, Seyamak; Issue Notification for U.S. Appl. No. 13/372,408, filed Feb. 13, 2012; mailed Mar. 6, 2013, 1 pg.
Japanese Office Action for serial No. 2011-533427, filed Oct. 27, 2009, mailed Apr. 30, 2013, 15 pgs.
Hyland, Gregory E.; Final Office Action for U.S. Appl. No. 12/784,300, filed May 20, 2010, mailed May 29, 2013, 71 pgs.
Mexico Office Action for serial No. MX/A/2011/01283, filed May 20, 2010, mailed May 9, 2013, 8 pgs.
Hyland; International Preliminary Report on Patentability for serial No. PCT/US2010/035666, filed May 20, 2010, mailed Nov. 22, 2011, 6 pgs.
Hyland, Gregory; Mexico Office Action for serial No. MX/a/2012/015236, filed Dec. 19, 2012, mailed Jun. 13, 2013, 4 pgs.
Keyghobad, Seyamak; Notice of Allowance for U.S. Appl. No. 13/590,954, filed Aug. 21, 2012, mailed Jul. 9, 2013, 21 pgs.
Hyland, Gregory; Mexico Office Action for serial No. MX/a/2011/004330, filed Apr. 25, 2011, mailed Jul. 18, 2013, 6 pgs.
Hyland, Gregory E., Non-Final Office Action for U.S. Appl. No. 13/101,235, filed May 5, 2011, mailed Jul. 31, 2013; 57 pgs.
Hyland, Gregory E.; Non-Final Office Action for U.S. Appl. No. 12/606,957, filed Oct. 27, 2009, mailed Sep. 6, 2013; 53 pgs.
Splitz, David Edwin; Non-Final Office Action for U.S. Appl. No. 13/339,655, filed Dec. 29, 2011, mailed Sep. 16, 2013, 57 pgs.
Hyland, Gregory E.; Non-Final Office Action for U.S. Appl. No. 12/784,300, filed May 20, 2010, mailed Sep. 24, 2013; 37 pgs.
Hyland, Gregory; Mexico Office Action for serial No. MX/A/2011/012383, filed May 20, 2010, mailed Sep. 3, 2013, 10 pgs.
Hyland, Gregory; Mexico Office Action for serial No. MX/a/2011/004330, filed Apr. 25, 2011, mailed Oct. 3, 2013, 6 pgs.
Hyland, Gregory; Mexico Office Action for serial No. MX/a/2012/015236, filed Dec. 19, 2012, mailed Oct. 3, 2013, 8 pgs.
Hyland, Gregory; Japanese Office Action for serial No. 2012-512048, filed May 20, 2010, mailed Oct. 22, 2013, 51 pgs.
Keyghobad, Seyamak, Issue Notification for U.S. Appl. No. 13/590,954, filed Aug. 21, 2012, mailed Sep. 11, 2013, 1 pg.
Hyland, Gregory; Australian Patent Examination Report for serial No. 2009308949, filed Oct. 27, 2009, mailed Nov. 12, 2013, 3 pgs.
Hyland, Gregory E.; Final Office Action for U.S. Appl. No. 12/606,957, filed Oct. 27, 2009, mailed Dec. 17, 2013, 54 pgs.

* cited by examiner

SYSTEMS AND METHODS FOR TIME-BASED HAILING OF RADIO FREQUENCY DEVICES

TECHNICAL FIELD

The present disclosure generally relates to the operation of radio frequency devices, and more particularly relates to synchronizing data communications between radio frequency devices.

BACKGROUND

Typically, utility meters (e.g., gas meters, water meters, and electricity meters) are read manually by meter readers who are employees or contractors of the various utility providers. Manual meter reading represents a significant cost to a typical utility provider. With the advent of wireless technology including mesh networking, utility providers have sought methods and systems for remote reading of water meters and/or remote control of water supply valves.

Advanced Metering Infrastructure (AMI) or Advanced Metering Management (AMM) are systems that measure, collect and analyze utility data using advanced metering devices such as water meters, gas meters and electricity meters. The advanced metering devices combine internal data measurements with continuously available remote communications, enabling the metering devices to transmit and receive data through the AMI network. In a typical configuration, an advanced metering device, such as an advanced water meter, measures and collects usage data, such as water usage data, at a customer's location. The metering device then uses a built-in communication interface to transmit data to a parent node up the network, often in response to the parent's request for such information. In this way, utility providers may remotely "read" customer usage data for billing purposes.

SUMMARY

The present disclosure relates to systems and methods for communicating with a radio frequency (RF) device. An exemplary method includes: sending to the RF device a hailing signal based on a system time; and sending to the RF device a data message.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure describes systems and methods for operating radio frequency (RF) devices such as Advanced Metering Infrastructure devices (AMI) using frequency-hopping spread spectrum technology. More particularly, the systems and methods disclosed herein relate to time-based hailing of radio frequency devices.

Existing AMI deployments rely on and utilize mesh networks and mesh networking devices to transmit and to receive data between nodes within the utility provider's network. Many of these devices employ frequency-hopping spread spectrum (FHSS) technology in compliance with Federal Communications Commission (FCC) rules and regulations part 15 (47 C.F.R. §15). FHSS is a method of transmitting and receiving radio signals by rapidly switching among many frequency channels using a pseudorandom channel sequence known to both the transmitting and receiving devices.

Because of the remote placement nature of the advanced metering devices, it is desired to maximize battery life of the metering devices in order to reduce down time and to reduce the amount of maintenance that must be performed on the metering devices. Similarly, it is desired to maximize responsiveness in communications between the advanced metering devices and the utility provider network while complying with FCC rules and regulations. It is also desired to reduce interference and background noise that may cause communication failures and that may further decrease battery life of the advanced meters.

While the present disclosure relates to mesh networking, as those having ordinary skill in the art will recognize, the present disclosure may be utilized in other types of networking environments, such as point-to-point FHSS networks as well.

Figure 1:
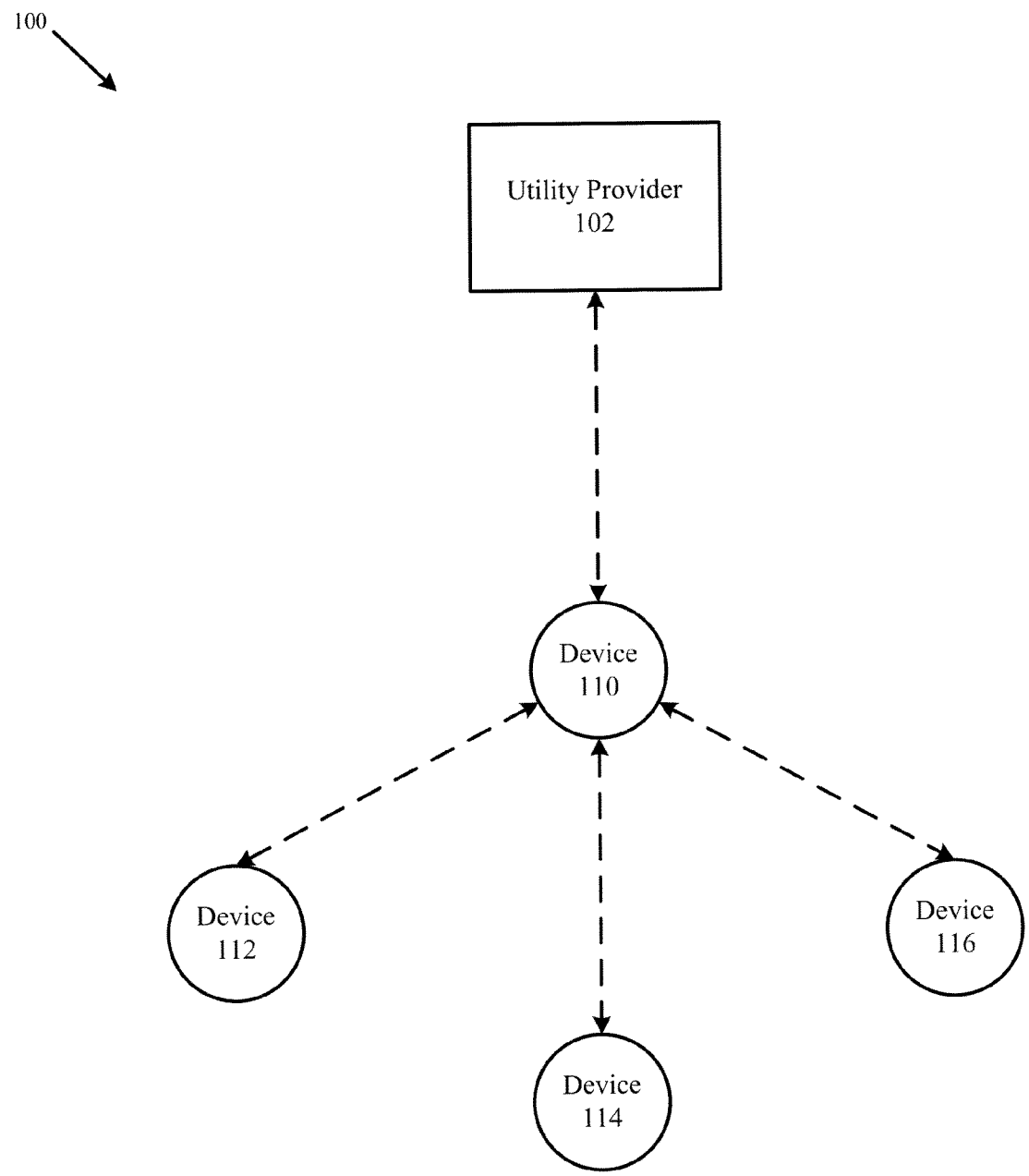
FIG. 1 is a block diagram of the network topology of an AMI mesh network in accord with one embodiment of the present disclosure.

As used herein, a MASTER state device, a device in MASTER state, or a master device is a device that is attempting to send data to another device. A SLAVE state device, a device in SLAVE state, a slave device, or a target device is a device to which the master is attempting to send data. As used herein, "parent" and "child" nodes should not be confused with "MASTER state" and "SLAVE state" devices. MASTER state and SLAVE state are merely states/modes for each device. "Parent" and "child" nodes have a predefined relationship based on hierarchy (i.e., a parent node such as device 110 in FIG. 1 is further up the hierarchy in relation to the utility provider 102 than a child node such as devices 112, 114, 116 in FIG. 1). Although the present disclosure describes a single parent to multiple child relationship, it should be understood that multiple parents may exist within the same network. Further, a child may have multiple parents. In various embodiments, a single parent may be paired with a single child. As an example, child nodes may represent individual customers' utility meters while a parent node may represent a primary data collection device responsible for collecting date from and sending data to each child device. This configuration requires that the parent device's system time be highly accurate.

Utility companies must periodically determine customer usage by taking meter readings. To facilitate this process and to reduce costs to the utility companies, utility meters in the present disclosure may transmit usage data wirelessly through a network, such as a mesh network, back to the utility provider. To reduce costs further while increasing reliability, it is an object of the present disclosure to increase battery life while increasing data transmission reliability and reducing system response times. To do this, each of the utility company's AMI RF devices is in one of 3 states: SLEEP state used to conserve battery life; SLAVE state used for responding to and receiving data from a MASTER state device; and MASTER state used to initiate communications with (i.e., "hail") and send data to a SLAVE state device.

In SLEEP state, a device partially awakens and briefly listens for a "hailing" signal on a hailing channel from another device in MASTER state. If the device in SLEEP state fails to detect a hailing signal, the device remains in SLEEP state and periodically partially awakens to listen for a hailing signal. The SLEEP state device changes hailing channels based on a predefined pseudorandom hailing channel frequency set dependent upon a system time. Once the SLEEP state device is "hailed" by a MASTER state device, it fully awakens and begins listening for data messages from the MASTER state device on a predefined data channel selected from the predefined pseudorandom data channel frequency set, the data channel being indicated by the MASTER state device. In other words, the SLEEP state device exits SLEEP state and enters SLAVE state.

In SLAVE state, a device listens for and receives data messages on a data channel selected from the predefined pseudorandom data channel frequency set. The MASTER state device indicates which data channel to use by sending a data channel pointer to the target device during the hailing process. After receiving each message from the MASTER state device, the SLAVE state device sends an acknowledgement (ACK) message to the MASTER state device, indicating a successfully received data message. The SLAVE state device and the MASTER state device then switch to the next data channel in the data channel frequency set and continue communications until all data messages have been sent.

In MASTER state, a device "hails" a SLEEP state device by sending a hailing signal on a hailing channel to the targeted SLEEP state device. The MASTER state device selects which hailing channel to use based on: 1) the SLEEP state device's predefined pseudorandom hailing channel frequency set, 2) a system time corresponding to the hailing channel frequency set, and 3) a unique serial number (the "nodeID") of the SLAVE state device. The system time on the MASTER state device and the system time on the SLAVE state device are substantially in synchronization. Upon successfully "hailing" the sleeping device (which upon hailing becomes a SLAVE state device), the MASTER state device begins sending data messages on a data channel to the SLAVE state device. The data channel is selected from the SLAVE state device's predefined pseudorandom data channel set based on the system time. In one embodiment, the data channel frequency set is common to the MASTER state device and the SLAVE state device. In such a configuration, the MASTER state device may indicate to the SLAVE state device during the hailing procedure what the next available data channel is by sending to the SLAVE state device a data channel pointer.

Hailing channels and data channels are selected from the 902-928 MHz industrial, scientific, and medical (ISM) bandwidth. In one embodiment, one hundred (100) channels are chosen with a minimum channel spacing of 100 kHz each. Fifty (50) of the channels are randomly assigned to the pseudorandom data channel frequency set, and fifty (50) different channels are randomly assigned to the hailing channel frequency set. The set of fifty (50) hailing channels are used during the MASTER and SLEEP states to send and receive hailing requests while the set of fifty (50) data channels are used during the MASTER and SLAVE states to send and receive data messages.

In one embodiment, a particular radio frequency device selects an initial subset of two (2) consecutive channels (i.e., a channel group) from its predefined pseudorandom hailing channel frequency set to be used while in the SLEEP state (by first calculating a channel offset based on its unique assigned serial number (the "nodeID")). This offset is added to a hailing channel pointer. The hailing channel pointer points to one of the fifty (50) available hailing channels, and increments to the next set of two (2) channels every, for example, 18 seconds so that each device will continuously "hop" through all of the fifty (50) available hailing channels at a system hopping rate. In this manner, hailing channel usage is spread across the predefined hailing channel. In one embodiment, the hailing channel usage may be substantially equal manner such that each channel within the hailing channel frequency set is used for substantially the same amount of time or for substantially the same number of times. In one embodiment, the hailing channel usage might be skewed to use hailing channels with less interference more frequently while using hailing channels with more interference less frequently. When sending and receiving data messages in MASTER and SLAVE states, the devices hop through the data channel frequency set to assure that, on average, all data channels are used equally.

Pseudorandom Frequency Sets

As will be further understood, the present disclosure utilizes two pseudorandom frequency sets: a predefined pseudorandom hailing channel frequency set and a predefined pseudorandom data channel frequency set. Hailing channels and data channels are randomly selected from the 902-928 MHz ISM radio bandwidth. In one embodiment, one hundred (100) channels are chosen having a minimum channel spacing of 100 kHz each. Fifty (50) of the channels are randomly assigned to the hailing channel frequency set, and fifty (50) different channels are randomly assigned to the data channel frequency set. In one embodiment, a different number of total channels, a different number of hailing channels, and/or a different number of data channels may be used. In one embodiment, the data channels and the hailing channels are mutually exclusive (i.e., every data channel is different from every hailing channel). In one embodiment, a subset of the data channels and the hailing channels may be the same, while other data channels and other hailing channels may be different. And in one embodiment, the set of data channels and hailing channels may be the same. In one embodiment, the channel spacing may be greater or less than the 100 kHz spacing discussed above.

A non-limiting, exemplary set of 50 hailing channels (from hailing channel 0 to hailing channel 49) includes the following frequencies:

| Ch. | Freq. | Ch. | Freq. | Ch. | Freq. | Ch. | Freq. |
| --- | --- | --- | --- | --- | --- | --- | --- |
| 0 | 926.8 MHz | 1 | 922.96 MHz | 2 | 925.48 MHz | 3 | 922.72 MHz |
| 4 | 922 MHz | 5 | 925.96 MHz | 6 | 922.84 MHz | 7 | 922.48 MHz |
| 8 | 923.32 MHz | 9 | 925 MHz | 10 | 923.2 MHz | 11 | 924.52 MHz |
| 12 | 925.12 MHz | 13 | 922.6 MHz | 14 | 923.68 MHz | 15 | 925.36 MHz |
| 16 | 924.16 MHz | 17 | 927.76 MHz | 18 | 927.88 MHz | 19 | 927.4 MHz |
| 20 | 924.76 MHz | 21 | 924.28 MHz | 22 | 926.92 MHz | 23 | 926.44 MHz |
| 24 | 927.16 MHz | 25 | 922.63 MHz | 26 | 924.04 MHz | 27 | 923.92 MHz |
| 28 | 923.56 MHz | 29 | 923.08 MHz | 30 | 922.24 MHz | 31 | 927.28 MHz |
| 32 | 926.2 MHz | 33 | 926.08 MHz | 34 | 923.8 MHz | 35 | 924.88 MHz |
| 36 | 925.24 MHz | 37 | 925.84 MHz | 38 | 923.44 MHz | 39 | 927.52 MHz |
| 40 | 922.12 MHz | 41 | 926.56 MHz | 42 | 924.64 MHz | 43 | 927.64 MHz |
| 44 | 924.4 MHz | 45 | 927.04 MHz | 46 | 926.68 MHz | 47 | 925.72 MHz |
| 48 | 926.32 MHz | 49 | 925.6 MHz | | | | | |

In one embodiment, these hailing channels may be grouped into hailing channel groups. For example, hailing channel group 0 may include hailing channels 0 and 1 (908.15 MHz and 919.8 MHz in the above example), while hailing channel group 1 may include hailing channels 2 and 3 (922.65 MHz and 902.65 MHz in the above example), continuing through hailing channel group 24. More generally, hailing channel group "n" may include hailing channel "x" and hailing channel "x+1" where "x" represents a hailing channel. In other embodiments, hailing channel groups may include a different number or combination of hailing channels.

A non-limiting, exemplary set of 50 data channels (beginning with data channel 0 and continuing through data channel 49) includes the following frequencies:

| Ch. | Freq. | Ch. | Freq. | Ch. | Freq. | Ch. | Freq. |
| --- | --- | --- | --- | --- | --- | --- | --- |
| 0 | 922.94 MHz | 1 | 922.1 MHz | 2 | 923.78 MHz | 3 | 922.46 MHz |
| 4 | 926.9 MHz | 5 | 927.26 MHz | 6 | 922.82 MHz | 7 | 923.3 MHz |
| 8 | 927.86 MHz | 9 | 927.5 MHz | 10 | 923.9 MHz | 11 | 926.42 MHz |
| 12 | 925.46 MHz | 13 | 927.38 MHz | 14 | 926.3 MHz | 15 | 925.7 MHz |
| 16 | 925.1 MHz | 17 | 926.18 MHz | 18 | 925.94 MHz | 19 | 924.02 MHz |
| 20 | 927.98 MHz | 21 | 926.66 MHz | 22 | 924.98 MHz | 23 | 927.62 MHz |
| 24 | 924.74 MHz | 25 | 925.22 MHz | 26 | 925.34 MHz | 27 | 924.62 MHz |
| 28 | 924.5 MHz | 29 | 926.54 MHz | 30 | 924.14 MHz | 31 | 923.66 MHz |
| 32 | 925.58 MHz | 33 | 922.22 MHz | 34 | 924.26 MHz | 35 | 927.02 MHz |
| 36 | 922.34 MHz | 37 | 926.06 MHz | 38 | 926.78 MHz | 39 | 923.42 MHz |
| 40 | 927.74 MHz | 41 | 924.86 MHz | 42 | 924.38 MHz | 43 | 922.7 MHz |
| 44 | 922.58 MHz | 45 | 925.82 MHz | 46 | 923.54 MHz | 47 | 927.14 MHz |
| 48 | 923.18 MHz | 49 | 923.06 MHz | | | | | |

In one embodiment, these data channels may be grouped into data channel groups. For example, data channel group 0 may include data channels 0 and 1 (922 MHz and 904.5 MHz in the above example), while data channel group 1 may include data channels 2 and 3 (908 MHz and 925 MHz in the above example), continuing through data channel group 24. More generally, data channel group "p" may include data channel "y" and data channel "y+1" where "y" represents a data channel. In other embodiments, data channel groups may include a different number or combination of data channels. In one embodiment, the data channels are not grouped.

In one embodiment, the hailing channel frequency set and the data channel frequency set are unique to each device/node within the system. However, in one embodiment, the hailing channel frequency set and the data channel frequency set may be the same or contain a portion of the same frequency channels. Each device/node has a "nodeID" which identifies it within the network. A device wishing to send a communication to a target device utilizes the target device's "nodeID" to identify the correct hailing channel frequency set and data channel frequency set to use for that particular target device. The "nodeID" is an identifier, such as an alphabetic and/or numeric string, associated with and unique to a device.

FIG. 1 is an exemplary block diagram of the network topology of an AMI mesh network, including utility provider 102 and AMI devices including RF devices 110, 112, 114, 116. The RF devices discussed herein may also be referred to as "AMI devices," "nodes," or "devices." The configuration of AMI devices shown in FIG. 1 is merely one configuration, and additional devices or alternative configurations may be used. As such, the configuration of AMI devices shown in FIG. 1 should not be seen as limiting but instead as merely exemplary. The dashed lines of FIG. 1 represent wireless communication links between the devices 110, 112, 114, 116 and the utility provider 102, which may be active during some periods of time and which may not be active during other periods of time, as will become clear throughout the present disclosure.

Figure 2:
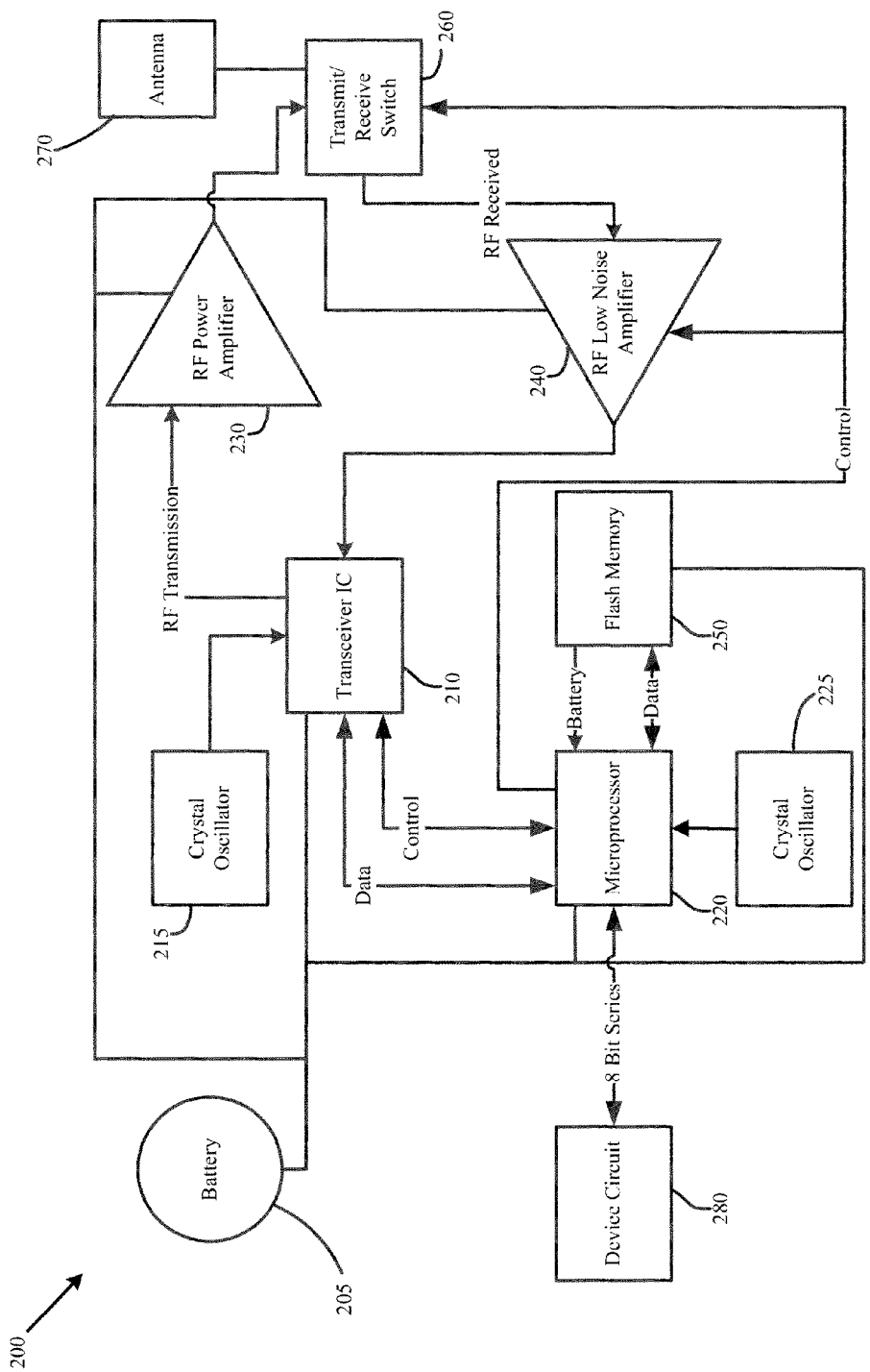
FIG. 2 is a block diagram of a radio frequency circuit in accordance with one embodiment of the present disclosure.

As seen in FIG. 2, an RF circuit 200 may be included in any of the AMI devices shown in FIG. 1, such as RF devices 110, 112, 114, 116. RF circuit 200 within each RF device 110, 112, 114, 116 enables the devices to communicate wirelessly with one another. Battery 205 powers a transceiver integrated circuit (IC) 210, a microprocessor 220, an RF power amplifier 230, an RF low noise amplifier 240, and flash memory 250. Crystal oscillators 215, 225 are connected to transceiver IC 210 and microprocessor 220, respectively. The circuit 200 includes a transmit/receive switch 260 and antenna 270. Although flash memory 250 is specified, any type of memory such as RAM, ROM, flash memory, etc. may be used with RF circuit 200, as understood by those having skill in the art.

A data line connects antenna 270 to the transmit/receive switch 260. RF received data from antenna 270 is fed into RF low noise amplifier 240 and then to transceiver IC 210. Transceiver IC 210 is connected to microprocessor 220 and to RF power amplifier 230. If RF transmission data is to be sent to antenna 270 and, thereby, to another remotely located communicator (for example, from RF device 110 to RF device 112 of FIG. 1), it is transmitted to the RF power amplifier 230 where it is amplified and transmitted to transmit/receive switch 260 and on to antenna 270 for communication. In one implementation, meter data is wirelessly received and transmitted to and from a host and remotely located meter nodes connected to water meters.

Microprocessor 220 and transceiver IC 210 include both a two-way data and a two-way control line. Microprocessor 220 includes a control line to each of RF low noise amplifier 240 and transmit/receive switch 260. Microprocessor 220 is also connected to flash memory 250 by both a two-way data line and by a battery status line, the battery line included so that flash memory 250 may notify microprocessor 220 of its power and battery status. Finally, microprocessor 220 is connected to a device circuit 280. In one embodiment, device circuit 280 may include a utility meter such as a water meter or an electricity meter. In one embodiment, device circuit 280 may be a reporting and testing device, such as a water or gas leak detection device. These examples are not meant to be limiting, and those of skill in the art will recognize that alternative device circuits may be used in conjunction with the present disclosure. Note, other supporting circuitry and memory may not be shown in the figures of this disclosure but would be understood by those of reasonable skill in the art.

RF circuit 200 may be configured on various radio topologies in various embodiments, including point-to-point, point-to-multipoint, mesh networking, and Star, among others. RF circuit 200 may be configured to communicate in multiple topologies or in one of multiple topologies.

RF devices such as those shown in FIG. 1 (devices 110, 112, 114, 116) and FIG. 2 may be in one of 3 states at any given time: SLEEP state used to conserve battery life; SLAVE state used for responding to and receiving data from a MASTER state device; and MASTER state used to initiate communications with (i.e., "hail") and to send data to a SLAVE state device. A device initiating a communication is referred to herein as the "master" or the "MASTER state device" and the device which is the target of the communication is the "target," the "target device," the "slave" or the "SLAVE state device."

Sleep State

Figure 3:
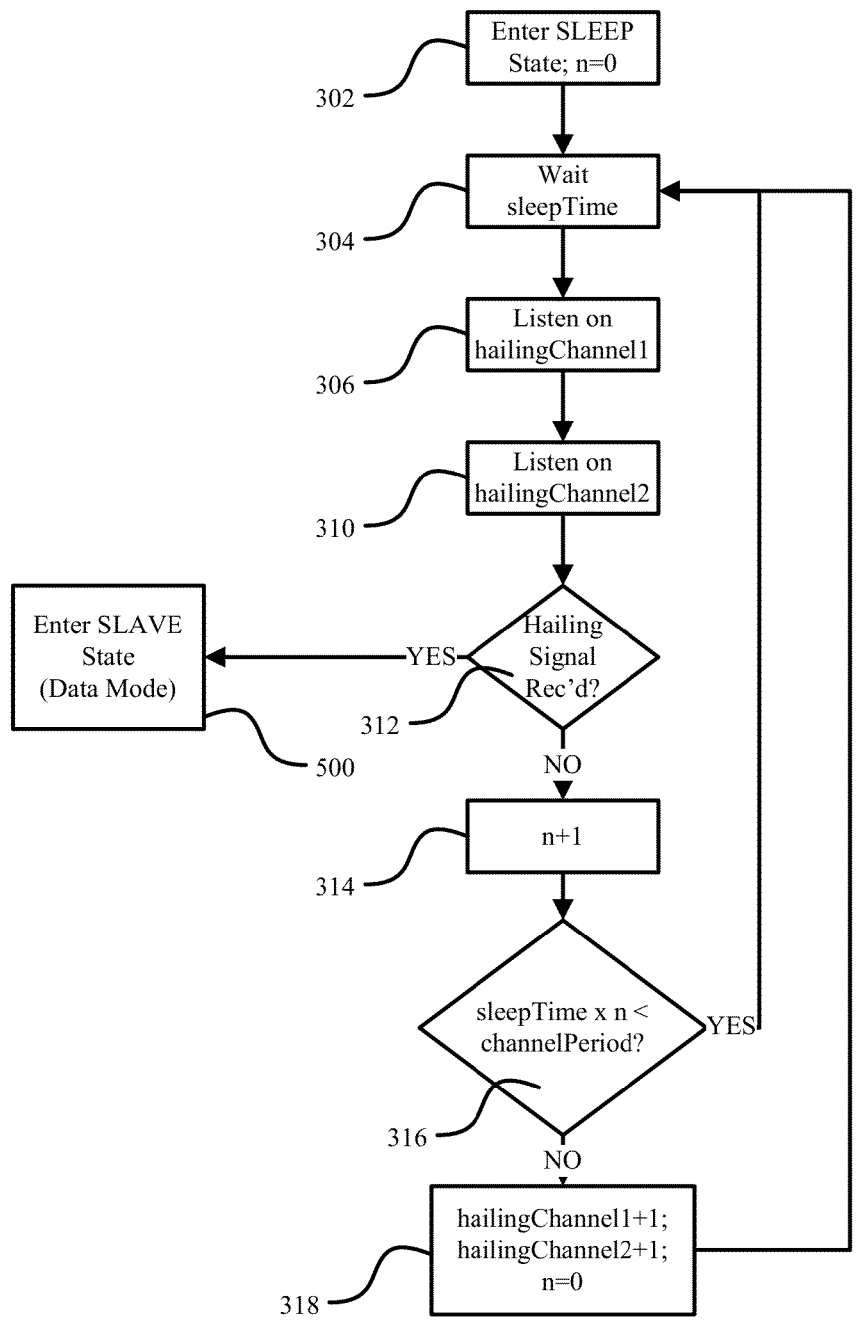
FIG. 3 is a flow diagram of the SLEEP state of an RF device in accord with one embodiment of the present disclosure.

FIG. 3 is an exemplary flow diagram 300 of the SLEEP state of an RF device. Some AMI devices (e.g., RF devices 110, 112, 114, 116) are battery powered. To maximize the life of the device batteries, these devices are normally in SLEEP state until it is time to transmit and/or to receive data messages. In this state, the AMI device, such as RF device 112, is in a "deep sleep" (i.e., very low power mode) and wakes up once every 0.75 seconds to listen for a hailing signal from a device in MASTER state, for example, such as RF device 110 in FIG. 1. During this short listening period, 1-2 milliseconds, for example, the device listens to its currently-defined hailing channel group consisting of two (2) hailing channels from the hailing channel frequency set. While a two hailing channel configuration is disclosed, single channel or other multi-channel configurations may be used. If radio frequency power (e.g., a hailing signal) is detected on one of the hailing channels, the AMI device then tries to decode a hailing message on that channel, the hailing message containing a pointer to a particular data channel (the data channel pointer). Once a device in SLEEP state has received a hailing message, the device then synchronizes with the transmitting device (i.e. the master) through any remaining channels of the two hailing channel set and then switches to the proper data channel, as indicated by the data channel pointer. Once on the proper data channel, the SLAVE state device waits for a data channel message from the master. Once the data channel message is received, the target device responds with an acknowledgement message (ACK message) on the same channel and then switches to the next data channel in the data channel frequency set.

Still referring to the exemplary method of FIG. 3, a device such as RF device 112 of FIG. 1, which may be battery powered, enters SLEEP state upon the termination of a prior data transmission at block 302. At block 304, the device waits for a period of time known as the "sleepTime" before proceeding to block 306. At block 306, the AMI device listens for a hailing signal on a first hailing channel. Selection of hailing channels is discussed above in the Pseudorandom Frequency Sets section, and an exemplary hailing channel frequency set and data channel frequency set are shown. In one embodiment, the present disclosure may determine whether to enter SLAVE state (enter data mode) at block 500 after listening on each hailing channel individually.

After listening on the first hailing channel, the AMI device then listens for a hailing signal on a second hailing channel at block 310 (and any subsequent hailing channels if more hailing channels are present in the hailing channel group). If a hailing signal is detected (block 312) on the second hailing channel, the AMI device enters SLAVE state for receiving data at block 500, as discussed below. If no hailing signal is detected (block 312) on the second hailing channel, the AMI device then prepares to enter the deep sleep during which the AMI device does not attempt to detect a hailing signal. To enter this deep sleep, the AMI device increments its wait time counter (block 314), then determines whether the total hailing time (e.g. sleepTime×n) is less than the total channelPeriod (block 316). The total channelPeriod is the amount of time the AMI device utilizes one hailing channel or group of hailing channels before moving on to the next. If so, the AMI device enters the deep sleep and waits a duration of sleepTime before attempting to detect a hailing signal again. In one embodiment, the sleepTime may be approximately 750 milliseconds; however this time may be adjusted depending on the number of hailing channels used during each cycle. If the total wait time is greater than or equal to a predetermined total channelPeriod (block 316), the AMI device increments its hailing channel counters at block 318 such that the first hailing channel becomes a third hailing channel and the second hailing channel becomes the fourth hailing channel, the hailing channels being determined from the hailing channel frequency set. In one embodiment, the channelPeriod may be approximately 18 seconds, which would result in every hailing channel—for example, 50 hailing channels when used two-at-a-time—being used over a 7.5 minute period. As persons having ordinary skill in the art recognize, a different channelPeriod and/or a different sleepTime may be advantageous.

In another embodiment, an AMI device such as RF device 112 of FIG. 1 may be a line powered device that does not need to conserve power and can therefore utilize a more aggressive channel monitoring procedure than a battery powered RF device. Line powered AMI devices may continuously sample all 50 of its hailing channels without waiting a sleepTime between sampling. In this configuration, the sampling method is similar to the battery operated device method shown in FIG. 3, but sampling is continuous. That is, both methods sample the RF power in each channel. When RF power is detected in one of the hailing channels, the unit will then try to decode a hailing message on that channel. When a hailing message is successfully decoded, it contains a data channel pointer to a particular data channel. Once an AMI device receives a hailing message, the AMI device then synchronizes with the transmitter through any remaining channels of the two channel set. The AMI device then switches to the indicated data channel and waits for a data channel message from the master. Once the data channel message is received, the AMI device responds with an ACK message on the same channel. The device then switches to the next data channel in the data channel frequency set to continue receiving the data message.

Slave State

Figure 4:
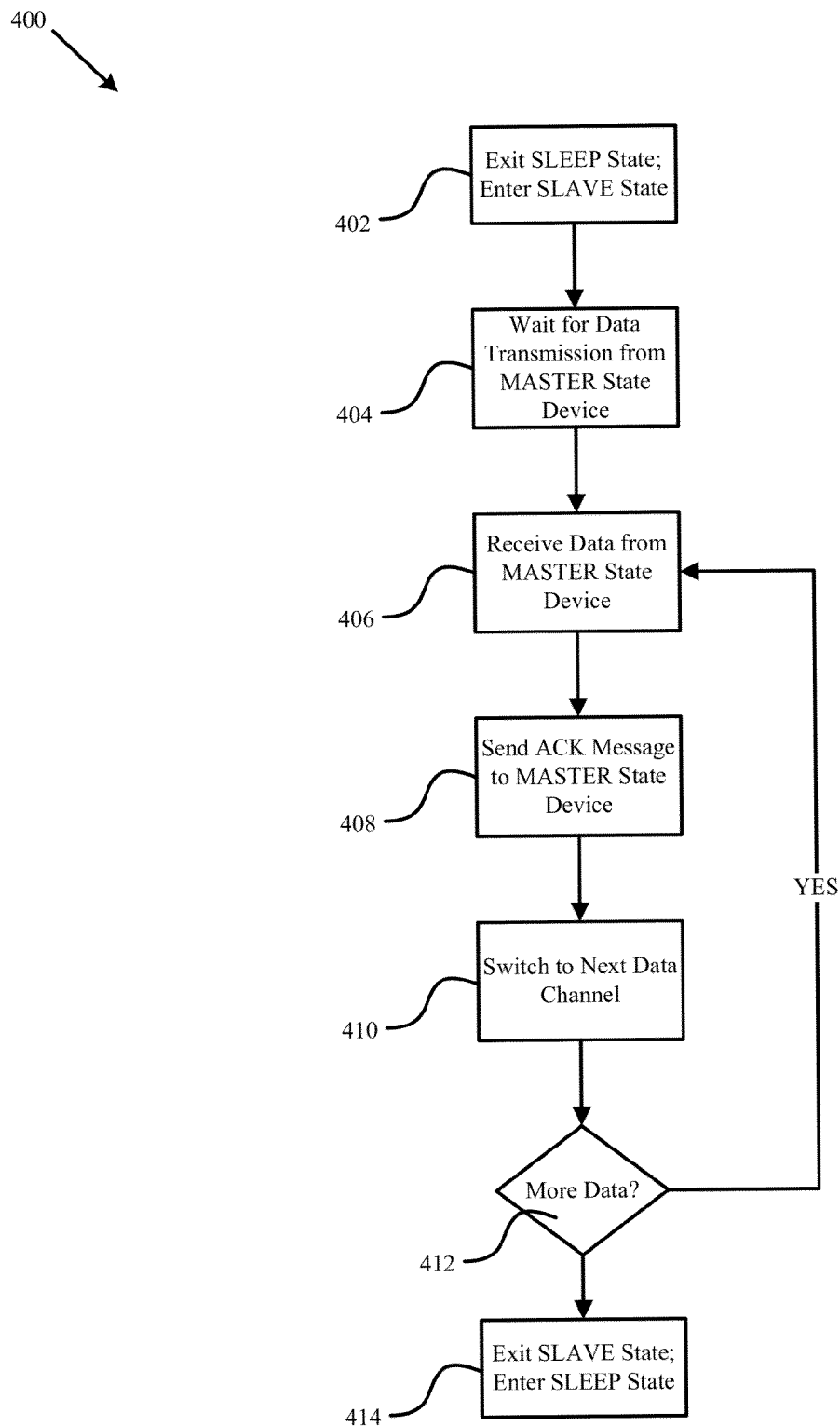
FIG. 4 is a flow diagram of the SLAVE state of the RF device of FIG. 3.

In an exemplary method of receiving data messages 400 shown in FIG. 4, a target device in SLAVE state such as RF device 112 of FIG. 1 is awake after having synchronized successfully through being hailed by a device in MASTER state, discussed below, such as RF device 110 of FIG. 1. Once the target AMI device transitions from SLEEP state to SLAVE state (block 402), the target AMI device waits for data transmission from the AMI device in MASTER state (block 404). The target AMI device determines which data channel selected from its data channel frequency set to use based on the data channel pointer sent during the hailing procedure by the MASTER state device. When data messages are received (block 406), the SLAVE state device responds to the MASTER state device by transmitting an ACK message on the same data channel (block 408) back to the MASTER state device. After sending the ACK message (block 408), the SLAVE state device switches to the next data channel in the data channel frequency set (block 410) to wait for more data from the MASTER state device (block 412). If the MASTER state device has additional data to transmit, it sends the additional data on the next data channel. The cycle continues until the MASTER state device has no more data to transmit. Once the last data message has been received and the final ACK message has been sent (or the device times out waiting for a message), the SLAVE state device will return to the SLEEP state (block 414).

Master State

Figure 5:
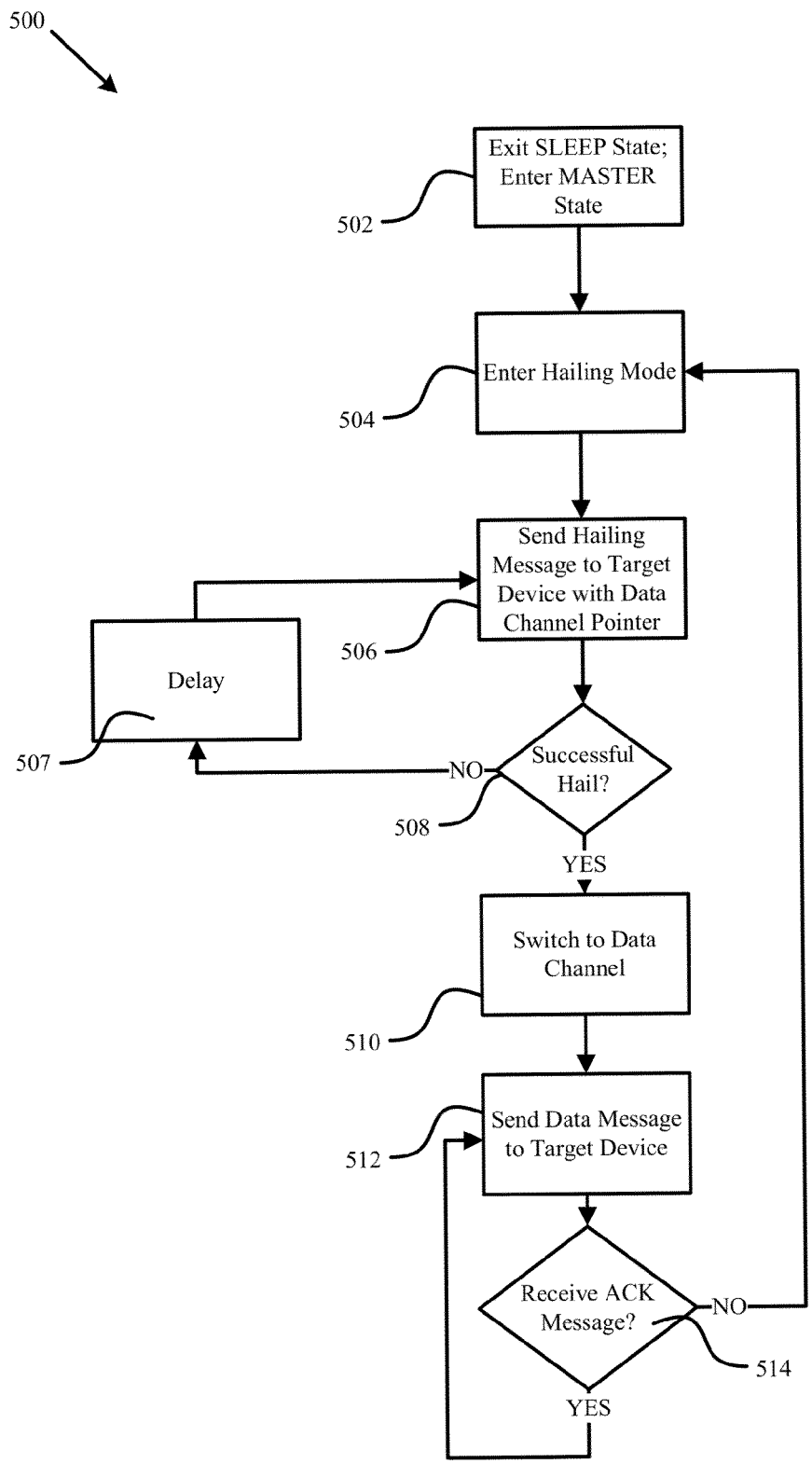
FIG. 5 is a flow diagram of the MASTER state of the RF device of FIG. 3.

In an exemplary method of transmitting data messages 500 shown in FIG. 5, an AMI device in MASTER state such as RF device 110 of FIG. 1 is in one of two modes of operation: hailing mode for hailing and synchronizing with an AMI device in SLEEP state using the hailing channel frequency set; and data mode for transmitting data to and receiving data from a device in SLAVE state using the data channel frequency set. As indicated above, the AMI device in MASTER state uses hailing mode to synchronize communications with and to connect to the AMI device that is in SLEEP state. First, beginning at block 502, the device exits SLEEP state and enters MASTER state for synchronizing with and sending data to another AMI device. In hailing mode (block 504), the MASTER state device sends a hailing message on the hailing channel(s) currently being sampled (as determined from the hailing channel frequency set, system timer, and nodeID) by the device that is in SLEEP state (block 506). Each hailing message contains a data channel pointer indicating which sequentially next data channel to use from the data channel frequency set. If the hailing attempt is unsuccessful (block 508), the MASTER device attempts additional hailing attempts after waiting a delay period (block 507) and retries the hailing procedure as discussed herein with particular reference to FIG. 9.

After successfully hailing the SLEEP state device (which then enters SLAVE state) and synchronizing communications, the MASTER state device will switch to the indicated data channel (block 510) and send a data message to the target device (block 512). If an ACK message is received (block 514) from the SLAVE state device, the MASTER state device switches to the next data channel (as determined from the predefined pseudorandom data channel frequency set) and continues sending data. If no ACK message is received (block 514) by the MASTER state device from the SLAVE state device, the MASTER state device switches to the next set of hailing channels and retries hailing and synchronization (block 504). In one embodiment, the total occupancy of any channel will be less than 400 milliseconds within a 20 second period.

Once in data mode, the MASTER state device sends data in each of its data channels, switching channels only after receiving an ACK message from the SLAVE state device, until all data has been sent. The data length is variable depending on the amount of data to be transmitted. Each new data transmission begins on the sequentially next channel in the MASTER state device's normal data hopping sequence as determined from the data channel frequency set. In one embodiment, data channel usage is therefore spread across the data channel frequency set substantially equally to minimize the channel occupancy and assure that, on average, all channels in the data channel frequency set are used substantially equally. In one embodiment, it may be desirable to use certain data channels for longer periods or more often than other data channels, such as to use data channels with a lower interference level more frequently than data channels with a higher frequency. At the end of the data transmission, both the MASTER state device and the SLAVE state device return to SLEEP state. In one embodiment, scheduled communications (uploads from a MASTER state device to other devices) have a minimum random delay time added to the start of hailing of, for example, at least 7.5 minutes. The random delay time ensures that, on average, all of the hailing channels are used equally by beginning the hailing process at different channels on a random basis.

System Description

The following describes the operating mode and settings for radio frequency enabled nodes/devices.

Battery Life Considerations

For battery operated RF devices, the biggest drain on the projected battery life is caused by the periodic "sniffing" of hailing channels and the time spent transmitting. To achieve the best system performance, the sniffing rate on the receiving side should be balanced with the amount of hailing that needs to be sent from the transmitting side. With this balancing in mind, it has been determined that an optimum system performance for minimum battery drain (and thus maximum battery life) is a "sniffing" rate of approximately 800 milliseconds and a hailing transmission of approximately 800 milliseconds (this equates to two hail messages). However, due to the way the timers within the processor operate, it may be necessary in some embodiments to reduce the sniff rate to, for example, approximately 750 milliseconds. As persons of ordinary skill in the art recognize, other sniffing rates and/or hailing transmission times may be required depending on hardware specifications and environmental factors.

In theory, these rates produce a near 100% success rate for hailing between devices. However, in practice environmental interference and device hardware reduce the actual success rate somewhat. It is impossible to predict the average success rate because the environmental interference is completely unpredictable, as those skilled in the art appreciate. In some embodiments, a first hail hit rate of better than 90% is likely.

Figure 6:
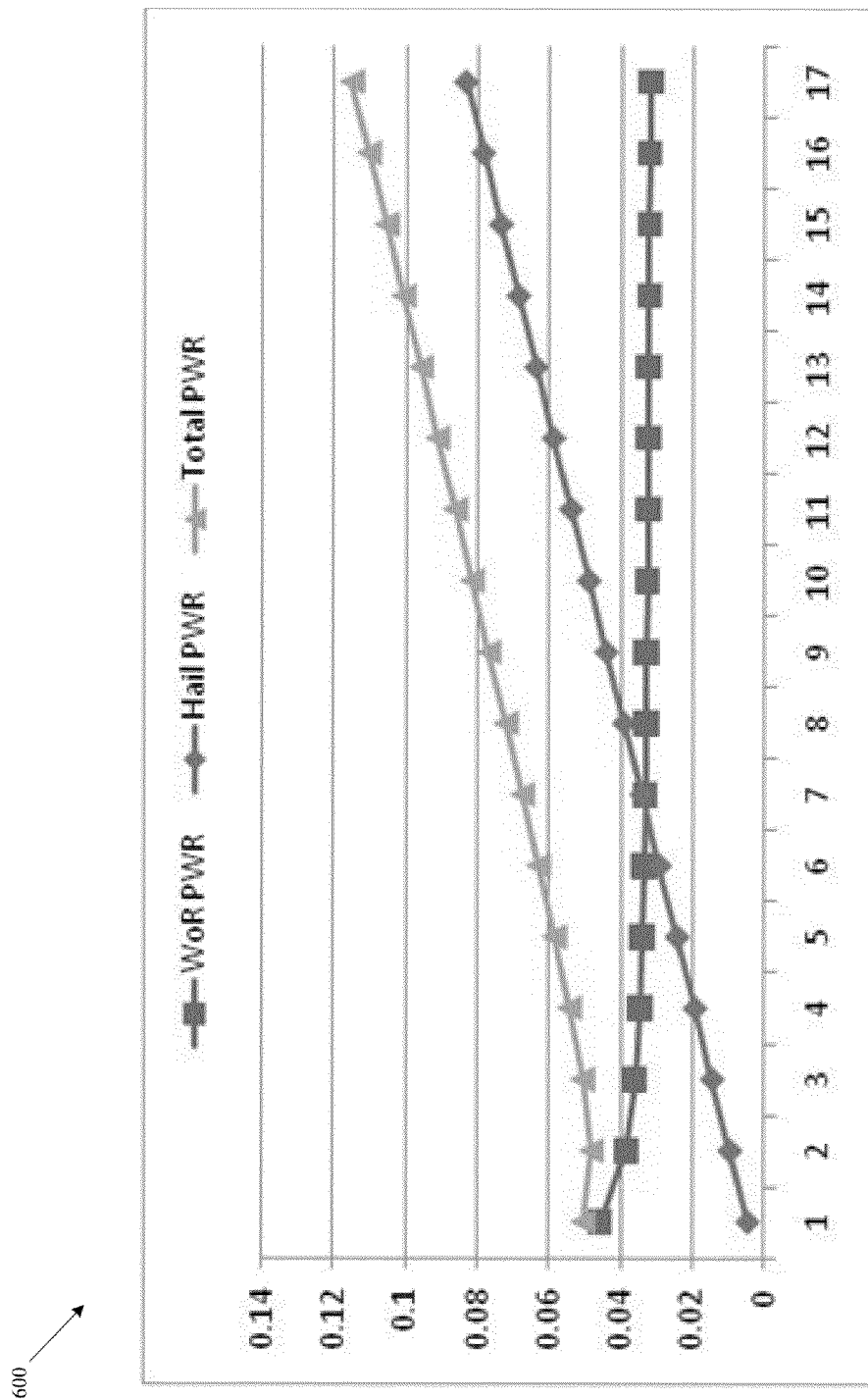
FIG. 6 is a graph of power usage in an exemplary system in accord with one embodiment of the present disclosure.

FIG. 6 shows a graph 600 of power usage in an exemplary system of the present disclosure. "WoR PWR" represents the average rate of current draw in milliamps ("ma"). In one embodiment, the current draw occurs in periodic pulses. For example, in one embodiment, a pulse may be 10 milliamps for 10 milliseconds, and that pulse may repeat at a rate of once every 1000 milliseconds. The current draw between pulses may be less, for example 1 milliamp, during the 990 millisecond period between pulses. In this example, the average current draw is calculated using the following equation:

$$\frac{(10 \text{ ma} * 10 \text{ ms}) + (1 \text{ ma} * 990 \text{ ms})}{1000 \text{ ms}} = 1.09 \text{ ma}$$

FIG. 6 shows the plot of the average power for the WoR, the average power used in the hailing process, and the sum of these two values. In this way, the optimum number of hailing channels required to minimize the average current draw on the battery may be determined. As the number of hailing channels increases, the number of channels sniffed increases, but these channels are "sniffed" less frequently. "Hail PWR" represents the average milliamps used for one hailing attempt in a day. The power increases with the total number of channels used in the hailing attempt. TotalPWR is the sum of Hail PWR and WoR PWR.

System Clock

In order for "hailing" to occur properly, the MASTER state device and the SLEEP state device must know which hailing channels to use at any given time. As discussed, each device has a hailing channel frequency set. When a MASTER state device needs to send data to another device, which is in SLEEP state, the MASTER state device selects a channel from the SLEEP state device's hailing channel frequency set based on a system time and the SLEEP state device's nodeID, which is known to the MASTER state device. That is, the MASTER state device and the SLEEP state device share a common system time, and the hailing channel to be used is selected from the hailing channel frequency dependent upon the system time.

In one embodiment, the system clock ("sysClock") may be the only time reference kept by a device. By itself, the sysClock time has no meaning relative to wall clock time. Rather, it merely tracks the elapse of real time. In one embodiment, the sysClock may be in synchronization with wall clock time. The sysClock is a counter maintained by the firmware within each device and is based on a periodic signal generated by each devices' hardware (such as by oscillator 225 and microprocessor 220 in FIG. 2). The firmware is responsible for configuring the hardware of each device such that a periodic interrupt (the "sysTimer interrupt") is generated, for example, every approximately 750 milliseconds in one embodiment. The "sysTimer interrupt may vary in frequency, as recognized by those having skill in the art.

The sysTimer interrupt is derived from a crystal and hardware based prescaler. These crystals typically have an accuracy of 20 ppm-100 ppm. However, to ensure reliability within the system, an accuracy of 5 ppm or less is preferred. For this reason, a more precise value for the sysTimer interrupt may be required, although other precision levels may be advantageous depending on the particular embodiment as recognized by those of ordinary skill in the art. The value of the sysClock is incremented each time the sysTimer interrupt is processed. The value of the increase is determined by the firmware calibration procedures described below in the Firmware Calibration section.

In one embodiment, a device may contain a hardware real-time clock (RTC) chip. The RTC chip is not used as the wall clock reference time, but instead, the RTC chip serves as a backup to the sysClock. Since the sysClock is much more accurate than the RTC, the RTC is set from the sysClock reference at the start of each upload. If a unit with an RTC chip is reset, for example following a power failure, it then determines if the value contained in the RTC is valid and if so, the device loads its sysClock counter from the RTC chip. If the RTC chip time is not valid, then the sysClock will restart from 0.

Firmware Calibration

In the time-based hailing of the present disclosure, the time drift between any two nodes should be, for example, approximately one second per day or less. Many of the current commercially available products have hardware not capable of supplying the required accuracy; therefore, a firmware calibration may be needed to alter the sysClock to achieve the desired accuracy and reliability. As those skilled in the art recognize, the firmware calibration process should be executed periodically to maintain the required accuracy.

A firmware calibration may be performed by comparing a high-accuracy clock reference generated from a radio frequency temperature-compensated crystal oscillator (TCXO) (for example, crystal oscillator 225 in FIG. 2) with an accuracy of approximately 2 ppm (known as "ref_clock") to the sysClock used to produce the sysTimer. In order to satisfy the accuracy requirement, the sampling time and ref_clock may include:

$$\frac{1/\text{ref\_clock\_freq}}{\text{sample\_time}} * 10^6 \leq 5(ppm)$$

where "ref_clock_freq" is the frequency of the reference clock derived from the TCXO and "sample_time" is based on a number of sysTimer interrupts.

Since the sysTimer interrupt is derived from the hardware crystal oscillator within the RF device (for example, crystal oscillator 225 in FIG. 2), its accuracy is the same as the crystal oscillator, which may be, for example, approximately 100 ppm. In order to achieve the heightened precision required by the hailing process of the present disclosure, the actual value of the sysTimer interrupt may be determined. This is done by counting the number of ref_clock cycles during a sample time. A more accurate value of the sample time can then be calculated by multiplying the number of ref_clock cycles counted by the period of the ref_clock ("ref_clock_count"):

$$ActualSampleTime = \text{ref\_clock\_count} * \frac{1}{\text{ref\_clock\_freq}}$$

The true value of the interrupt can then be calculated by dividing the actual sample time by the number of interrupts used to generate the sample time:

$$TrueInterruptValue = \frac{ActualSampleTime}{NumberOfInterrupts}$$

The value of the sysClock is then increased by the true interrupt value each time the interrupt is processed.

UTC Time

Coordinated Universal Time ("UTC") is calculated by adding a utcTimeOffSet variable to the current sysClock time. The utcTimeOffSet variable is stored, in one embodiment, in EPROM. As those skilled in the art recognize, other types of memory may be used. The value of the utcTimeOffSet is the difference between the local sysClock and the UTC time received from a device in MASTER state during the hailing procedure as described herein. The utcTimeOffSet variable is updated periodically (e.g., at least once per day at the start of an upload attempt). UTC Time is defined as timeSync plus the utcTimeOffSet:

$$UTCtime = sysClock + utcTimeOffSet$$

Timesync

Timesync data contains a four-byte value that represents the source UTC time (e.g., which RF device sent the UTC time). When a device receives timesync data and resolves to use that information, it calculates a new utcTimeOffSet value as follows:

$$utcTimeOffSet = (timeSyncData) - (sysClock)$$

Timesync information is always included in both a ping message (sent by the MASTER state device) and a pong ACK message (sent by the SLAVE state device). In this way, both the MASTER state device and the SLAVE state device exchange timesync information as part of the hailing procedure. Each device only uses timesync information if it is sourced from one of its "parent" nodes. Otherwise, the timesync information is discarded by the "child" node unless the child node has no parents. In this case, the received timesync information is used by the child node regardless of the source of the timesync. Ultimately, the parent node is the master clock and hailing timer source for all of its children. The parent must have a stable timing reference that allows only minimal timer shifts to propagate through the network via its children. This can be achieved using the same firmware calibration procedure described in the Firmware Calibration section above. In one embodiment, the parent may utilize the standard simple network time protocol (SNTP) to retrieve time information from a remote data source such as the Internet. The parent may update its time once per day, for example, or on some other periodic schedule.

Figure 7:
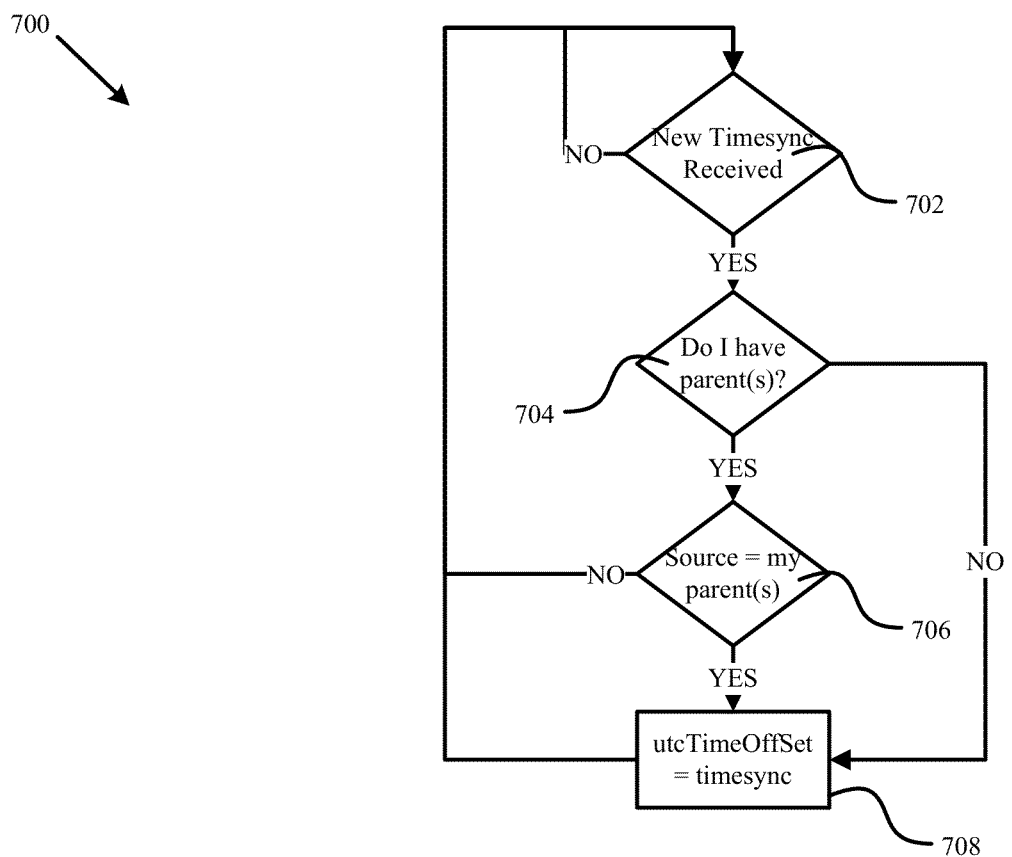
FIG. 7 is a flow diagram showing a process for receiving a timesync in accord with one embodiment of the present disclosure.

FIG. 7 is a flow diagram showing the process 700 relating to a device receiving a timesync from another device. In one embodiment, the device (such as RF device 112 shown in FIG. 1) polls to determine whether it receives a timesync (block 702). If not, the device continues to poll (block 702). If the device does detect a received timesync at block 702, the device determines whether it has a parent device (such as RF device 110 shown in FIG. 1) (block 704). If the device does have a parent as determined at block 704—or multiple parents in one embodiment—the device then determines whether the timesync was sent by its parent (or one of its parents) (block 706). If so, the device updates its utcTimeOffSet to equal the received timesync from its parent (block 708). Upon updating its utcTimeOffSet, the device returns to polling for a new timesync (block 702). However, if the device has a parent (or multiple parents), and the timesync was not sent by one of the device's parents, the device rejects the timesync and continues polling for a new timesync (block 702). If the device has no parents, however, it accepts any received timesync and updates its utcTimeOffSet to equal the received timesync (block 708). Upon updating its utcTimeOffSet, the device returns to polling for a new timesync (block 702).

In one embodiment, the device may not poll and instead timesync information is received via the hailing signal, which may include the timesync information.

Restoring UTC Time After Reset—For AMI devices that contain a hardware UTC device, after any reset (such as through regular maintenance or through prolonged power outage) the AMI device verifies that the UTC time is valid first by checking to see if the oscillator stop flag ("OSF") (such as for oscillator 225 shown in FIG. 2) is set in the device. If the OSF is set, then the UTC time in the device is not valid. If this is the case, the device uses data from the RTC chip to recreate the sysClock and verify that the resulting UTC time calculation returns a date after the stored firmware release date. The present disclosure utilizes the firmware release date, which represents the date that the firmware load was released to production from the manufacturer, to verify the system time. For example, when the system time is lost, such as because of a prolonged power outage, the value of the RTC chip may show a time many years in the past. The firmware release date provides a reference date for comparing to the system clock to ensure that the new system time is reasonable. If the date is before the firmware release date then the time is invalid. If a device cannot restore a valid sysClock from an UTC device, then it may request a valid timesync from a parent device.

System Hailing Timer

Figure 8:
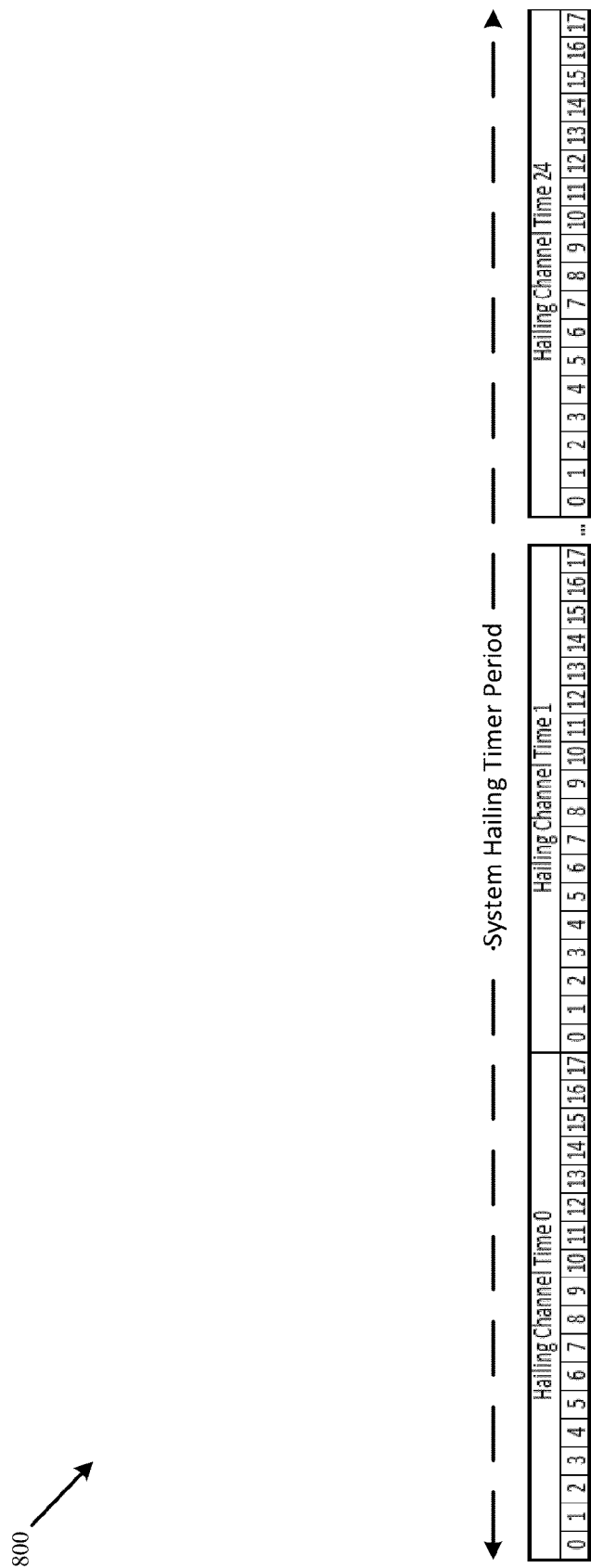
FIG. 8 is a diagram of hailing groups used a system hailing timer in accord with one embodiment of the present disclosure.

The system hailing timer is a virtual timer within each RF device that operates continuously. In one embodiment, as shown in FIG. 8, the system hailing timer period is a 450 second timer; however, other timer values may be desirable as those of reasonable skill in the art can appreciate. In one embodiment, the value of the system hailing timer is calculated by adding the utcTimeOffSet variable to the current sysClock value plus an offset calculated from the node ID and then performing a modulo operation on that result equal to the timer period (for example, 450), as follows:

$$systemHailingTimer = (sysClock + utcTimeOffSet + nodeIDoffset) \% timerPeriod$$

For a device in SLEEP state, when calculating which hailing channels to monitor, the local nodeID is used to calculate the offset. For a device in MASTER state, when calculating which hailing channels to use to transmit a hailing signal, the target SLEEP state device's nodeID is used to calculate the offset. The resulting value will point to one of the hailing channels selected from the hailing channel frequency set. This timer is common between nodes and controls the selection of both transmitting and monitoring/receiving hailing channels.

FIG. 8 shows a diagram of an exemplary hailing sequence using a 450 second system hailing timer period. The hailing timer period is broken into 25 hailing channel time periods of 18 seconds each. In this way, the 50 hailing channels from the hailing channel frequency set are paired into 25 channel pairs. Each hailing channel pair is assigned to a hailing channel time (e.g., hailing channel time 0, hailing channel time 1, . . . , hailing channel time 24). Each hailing channel time is 18 seconds long in one embodiment, meaning that a SLEEP state device will attempt to detect a hailing signal on only these two channels periodically for a period of 18 seconds. The hailing method is further described herein and shown, in particular, in exemplary flow diagram 300 of the SLEEP state in FIG. 3.

Super Sniffing Mode

In one embodiment, whenever a device receives a new timesync, regardless of the source, and the resulting time shift is more than a predefined threshold, for example, 7 seconds, the device enters "super sniffing mode." During super sniffing mode, the device attempts to detect a hailing signal on all 50 of its hailing channels sequentially with no waiting period between attempts, rather than using the hailing method disclosed for SLEEP state hailing. This embodiment enables the device to apply a new timesync from its parent more quickly and prevents the device from being disconnected from its own children. This embodiment further enables faster testing and debugging of the network when a valid timesync from a parent is unavailable, for example, during maintenance. When the source of the time shift is a parent of the device, the device stays in super sniffing mode for an extended period, for example, 24 hours. In other cases, the device stays in super sniffing mode for a significantly shorter period, for example, 20 minutes. Upon completion of super sniffing mode, the device returns to SLEEP state and normal hailing presumes.

Parent Node Operation

In one embodiment, a parent node such as device 110 in FIG. 1 may be responsible for hundreds or even thousands of child nodes such as devices 112, 114, 116, etc. of FIG. 1. As used herein, "parent" and "child" nodes should not be confused with "MASTER state" and "SLAVE state" devices. MASTER state and SLAVE state are merely states/modes for each device. "Parent" and "child" nodes have a predefined relationship based on hierarchy (i.e., a parent node such as device 110 in FIG. 1 is further up the hierarchy in relation to the utility provider 102 than a child node such as devices 112, 114, 116 in FIG. 1). Although the present disclosure describes a single parent to multiple child relationship, it should be understood that multiple parents may exist within the same network. Further, a child may have multiple parents. In various embodiments, a single parent may be paired with a single child. As an example, child nodes may represent individual customers' utility meters while a parent node may represent a primary data collection device responsible for collecting date from and sending data to each child device. This configuration requires that the parent device's system time be highly accurate.

Calibration

In one embodiment, a parent is assumed to have a more accurate time than its children. The parent therefore becomes a "time master" for the entire cell, the cell including the parent and each of its children, in one embodiment. To maintain clock accuracy, the parent device runs the same calibration algorithm as described above on its radio as described herein.

Real Time

In one embodiment, a device includes two processors; however, as those of reasonable skill in the art recognize, different numbers of processors may be advantageous depending upon the desired implementation. In a two-processor embodiment, a first processor (e.g., a "rabbit" processor) facilitates Internet communications, and a second processor (e.g., the radio processor) facilitates network communications between parent and child devices, such as those described herein between MASTER state, SLAVE state, and SLEEP state devices.

Upon initialization, the rabbit processor sets the radio processor's time if the rabbit processor knows the time. The rabbit processor further sets the radio processor's time once per day. In one embodiment, the rabbit processor may include a double battery back-up clock which maintains time across extended power failures. In one embodiment, accuracy of the rabbit processor may be limited to a 32 kHz crystal, which is approximately 20 ppm-100 ppm.

The rabbit processor may use the standard SNTP protocol, as discussed above, to retrieve time from the Internet. In another embodiment, other protocols may be used as known in the art. In an embodiment using the SNTP protocol, the Rabbit updates its time, for example once per hour or after a system reset. Time updates may be immediately applied or delayed. The rabbit system time is limited in one embodiment to shifting no more than, for example, 9 seconds after each new Internet time update unless its internal time is invalid, in which case it will apply the full time shift regardless of the time shifting limit. In this way, bad time shifting settings that would disrupt the network, for example a large shift in time such as minutes or hours, may be prevented.

In one embodiment, a parent may automatically push the time information (timesync) to its children when hailing, causing the children to update their time information (timesync). If the parent does not know the time, it will clear the pong timestamp in its hailing messages to notify the children not to update their clocks. In one embodiment, certain parents (for example, parents closer to the utility provider in the network hierarchy) may have their automatic time-syncing disabled and may only be time-synced when required, not automatically.

Hailing Channel Groups

In one embodiment, a hailing channel group is, for example, a set of two contiguous channels from the hailing channel set. In a configuration using 50 hailing channels, there are 25 channel groups that are non-overlapping and contiguous. For example, channels 0 & 1 represent group 0, channels 2 & 3 are group 2 and so on until the last two channels 48 & 49 are used to make group 24. Referring now to FIG. 8, "hailing channel time 0" represents the hailing channel time for group 0 (i.e., channels 0 and 1), "hailing channel time 1" represents the hailing channel time for group 1 (i.e., channels 2 and 3), and "hailing channel time 24" represents the hailing channel time for group 24 (i.e., channels 48 and 49). As persons of reasonable skill in the art will appreciate, different channel groupings (such as, for example, 3 channels per group) and/or different numbers of total channels may be advantageous in other embodiments.

As shown in FIG. 8, based on the hailing timer value, a device in SLEEP STATE monitors each hailing channel group (monitored for an incoming hailing signal from a MASTER state device) for 18 seconds, for example. Each RF device determines a starting channel group based on its nodeId.

Whenever the hailing timer wraps back to channel group 0 (i.e., channels 0 and 1), the device begins monitoring its starting channel group. Each channel group is monitored for 18 seconds, for example. Upon completion of each monitoring period, the device begins monitoring the next sequential channel group (shown as "channel time" in FIG. 8). After the device monitors channel group 24, the device monitors channel group 0. In an embodiment having 25 channels groupings of 2 channels per group, with each channel group being monitored for 18 seconds, it takes 450 seconds (7.5 minutes) to cycle through all 25 channel groups. In embodiments with other numbers of channels and/or channel groupings or with differing amounts of monitoring time, the total time to cycle through the entire channel grouping will vary accordingly. It is therefore possible to determine which channel group a device is monitoring based on the value of the hailing timer (sysTimer).

Hailing Attempts

When a device (i.e., a device in MASTER state or a master device) determines it is time to send information (i.e., a data message) to another device in the network (i.e., a target device, which is in SLEEP state), the master device first "hails" the desired device using the hailing method described herein. In this way, the devices achieve channel hopping alignment or become synchronized. In this configuration, the device initiating the communication is the "master" and the device which is the target of the communication is the "slave."

In order to maintain approximately equal use of hailing channels within the hailing channel frequency set, any periodic communication between nodes, such as a daily upload, may have a random start delay applied to the first hailing attempt. In one embodiment, the random start delay may range from 0 to 13 minutes. Asynchronous messages such as on-demand utility meter readings do not require additional random delay and hailing can begin immediately.

To hail a slave device, the master device first determines which hailing channel group the slave is monitoring. It does this by using the slave's nodeId to determine what the slave's starting channel group is. Next the master calculates which, for example, 18 second window the system hailing timer represents and adds that value to the slave device's starting channel group. Once the master has determined which hailing channel the slave is using, it sends its first hail attempt, which consists of one hailing message sent on each of the hailing channels in the hailing channel group. The transmission of a single hailing message occupies, for example, approximately 395 milliseconds in a two-channel-per-group configuration, so the pair of hailing messages will occupy, for example, approximately 790 milliseconds. This hailing attempt spans the entire sniffing window of the slave (i.e. approximately 750 milliseconds, as discussed in the Slave State and Sleep State sections above). In this way, the slave device will always have performed a channel sniff during a hail attempt. This helps ensure that, with the exception of local interference and/or background noise, it is reasonably certain that the slave device will detect the master device's hail attempt. In one embodiment, the first hailing attempt should not start in the first 2 seconds or last 2 seconds of the hailing window. This allows for a 1 to 2 second difference between devices, which can be caused by drift or delays in passing time sync information.

The hailing message contains a pointer to the master device's next channel selected from the data channel frequency set. After sending the hailing message, the master device switches to the selected data channel and sends a synchronize (ping) message. It then waits for a response acknowledgement (ACK or pong) message from the target device. If no response is received, the master retries the hail request. In one embodiment, this retry occurs during the next 18 second hailing window using the next hailing channel group. If the slave again fails to respond, the master device may continue attempting to hail the target device. If after a predetermined number of retries (for example, 3 retries) the master still has not received an ACK from the target device, it performs a "back-off and retry" procedure described in the Hailing Back-Off and Retry section below with reference to FIG. 9. If the master device receives an ACK message response from the target device, it first processes any timesync information, then switches to the next data channel and begins normal data communications. In one embodiment, a battery powered master device returns to the SLEEP state between each hailing attempt to conserve battery life. In an embodiment with a continuously powered master device, the master may not return to SLEEP state between each hailing attempt because no battery life conservation is necessary.

Hailing Back-Off and Retry

If, after completing a set of hailing retries as discussed, the master device has still failed to initialize communications with the target device, the master device backs-off for a random time (for example, between 2 and 13 minutes). After waiting this random time, the master device then performs another full hailing attempt and hailing retry cycle. If the master device is still unable to contact the target device, the master device may perform additional back-off and retry attempts. In one embodiment, a total number of retry attempts may be set (for example, 5 retry attempts). In this case, upon reaching the total of retry attempts, the master device will cease trying to contact that target device for a period of time (for example, 24 hours). In one embodiment, the master device may send an alert message with the particular target device's nodeID to the utility provider that it was unable to establish communications with that particular target device.

In an embodiment wherein an RF device has multiple parents, the above process of hailing, hailing retries and back-off, and retries is attempted for each configured parent until either all configured parents have been tried or successful contact is established with a parent.

Figure 9:
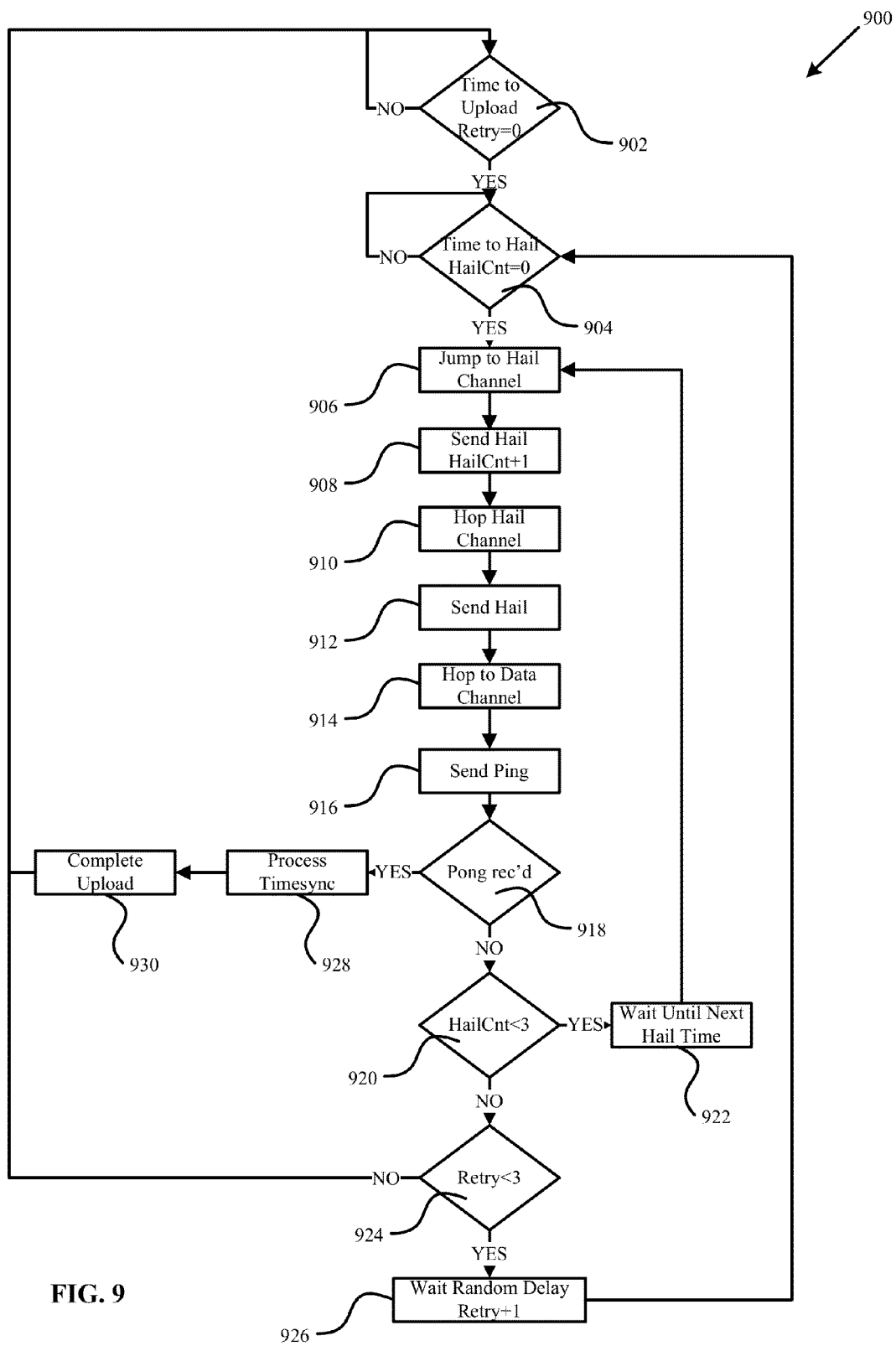
FIG. 9 is a flow diagram of an exemplary embodiment of a hailing and retry process used by an RF device in MASTER state in accord with one embodiment of the present disclosure.

FIG. 9 depicts a flow diagram of an exemplary embodiment of the hailing and retry process used by an RF device in MASTER state as described herein. At block 902, the device determines whether it is time to upload data and sets its retry counter to zero. If it is not time to upload, the device continues to determine whether it is time to upload at block 902. If it is time to upload, the device determines whether it is time to perform hailing and sets the hailing counter (HailCnt) to zero (block 904). If not, the device continues polling whether it is time to perform hailing (block 904). However, if it is time to hail, the device jumps to the first hailing channel selected from the hailing channel frequency set at block 906. Next, at block 908, the device sends a hailing message to the target device and proceeds to the next hailing channel (block 910). At block 912, the devices sends another hailing message to the target device and hops to the appropriate data channel selected from the hailing channel frequency set (block 914).

Once on the data channel, the master device sends to the target device a "ping" message (block 916). If the target device successfully receives the ping message and returns an ACK ("pong") message, which is received by the master device, the master device processes any necessary timesync information, as described herein, (block 928) and then proceeds to complete the data transmission (block 930).

If the target device does not respond to the master device's "ping" message by sending an ACK ("pong") message (block 918), the master device attempts a re-hailing of the target device if the HailCnt is less than a maximum hailing attempt value, for example, 3 hailing attempts (block 920). If the HailCnt is less than the maximum hailing attempt value, the master device waits until the next hailing time (block 922) and begins the hailing process again on the next hailing channel (block 906). However, if the HailCnt is equal to or greater than the maximum hailing attempt value, the master device will restart the entire upload attempt beginning at block 902 for a predetermined number of retry attempts (for example, 3 retry attempts) (block 924). Once the total number of retry attempts has been exceeded, the master device will wait a random delay period (for example, 2 minutes to 13 minutes as discussed above) (block 926) and begin the process again.

Hunting

When a master and slave are out of timesync (that is, when the sysTimer within the master is not in sync with the sysTimer of the slave), then the master does not know what hailing channel or hailing channel group a slave may be sniffing at any given time. When this occurs, in order to make a connection to the slave, the master may send a hailing message on all of the hailing channels, starting with the master's next hailing channel. Due to the additional time required to send 50 hails, the hail message contains an indication so that the slave will be aware of the additional hailing. After a hailing message has been sent on all hailing channels in the hailing channel frequency set, the master hops to the indicated data channel and sends a sync request (ping) message to the slave. The slave responds with an ACK message (pong) on the same data channel then hops to the next data channel in the data channel frequency set to begin data communications.

This process of "hunting" for a slave device uses a significant amount of battery power, so limiting the use of hunting as much as possible is desired. Hunting is only used for system requests and only after a set of normal hailing attempts has failed. It is also used when a particular device declares an extended outage as described below. Hunting causes one of the most significant network delays as well as causing a substantial drain on the battery life.

Extended Communications Failure Recovery

In one embodiment, each RF device maintains in memory a setting for how many days must pass without communicating with any parent after which the device enters into an extended outage mode. For example, this time period may be 10 days, although in other embodiments that duration may be shorter or longer, as persons having ordinary skill in the art can appreciate. If a device has failed to hail successfully its configured parent(s) for more than the extended outage period, it then assumes that it has lost time synchronization with its parent(s), causing the device to enter the extended outage mode.

When in the extended outage mode, the device no longer attempts any automated messaging (i.e., uploads, alerts, etc.) with its parent(s). The device does continue to hunt for its primary parent once, for example, every 5 days until the device successfully hails its parent. Once this occurs, the device exits extended outage mode. Battery-powered devices that experience frequent extended communications failures also experience reduced battery life because the hunting process requires significant battery power.

On Demand/Relayed Communications

In one embodiment, a device, such as device 110 of FIG. 1 may receive an asynchronous data message (such as, for example, an installation related message or an on-demand meter read request) from a source farther up the hierarchy, for example, from utility provider 102, with instructions to relay that data message to another device, for example, device 112. When a device attempts to forward an asynchronous relayed message, the device first performs a hailing attempt with the target device and, if unsuccessful, a hailing retry. If the target device responds to any of the hailing attempts, then the device forwards the relayed data message to the target device. Once the data message is sent to the target device and the target device sends the ACK message back to the sending device, the sending device returns to the SLEEP state.

If the target device fails to respond, the sending device initiates a "hunting" attempt as described in the Hunting section above. In one embodiment, the sending device initiates the hunting attempt immediately. However, in another embodiment, the target device may wait a predetermined or random amount of time before initiating the hunting attempt. If the hunting attempt fails, the sending device returns an indication of failure (NACK) to the source of the relayed message. If a device is successful in contacting the target device, it forwards the relay message to the target device and waits for a reply (i.e., an ACK message). If a device that receives a relayed message (i.e., the target device) is unable to process the request (such as because of a low battery), the target device returns a negative acknowledgement ("NACK") message to the sending device indicating that an error has occurred and, in one embodiment, specifying the cause of the error. Otherwise, upon the successful receipt of the relayed message, the target device responds with the ACK message to the sending device and then forwards the message as necessary or process the message itself if it is the final intended target of the message.

During installation, most devices are not in time synchronization with one another, and therefore a hunting procedure for each newly installed device is required. Once a device has been contacted through the hunting procedure described herein, it receives a hailing timer synchronization message. Since, during installation, a device likely does not have an assigned parent yet, the timesync information is applied immediately and no additional hunting is required, saving battery life.

In one embodiment, the following per synchronization delays may be expected:

| Number of Hailing Attempts | Sync Time (seconds) | |
|---|---|---|
| | Min | Max |
| 1 | 1 | 4 |
| 1 + 1 retry | 11 | 25 |
| 1 + 2 retry | 29 | 43 |
| 1 + 3 retry | 49 | 61 |
| 1 + 3 retry + hunt | 70 | 81 |

Parents Assigned by Field Radio

In one embodiment, a parent device may be configured by an installation technician using a field radio. Since the device does not have a parent initially assigned, the device accepts and immediately applies a timesync message received from the field radio operated by a technician.

Once receiving the timesync message from the field radio, the installed device attempts to contact its assigned parents, which may occur at preconfigured upload times. If a parent has already been installed with a valid timesync, then the installed device begins receiving and using timesync information from its parent. If the parent is not available, the installed device performs periodic attempts to contact the parent. In one embodiment, if the number of days without contacting the installed device's parent reaches the configured extended outage threshold, it begins a hunting procedure, described above in the Hunting section, for its parent. Once communication with the parent has been establish, the parent will send timesync information to the child (the installed device) and normal network communications may then follow.

Network Outage Recovery Examples

Figure 10:
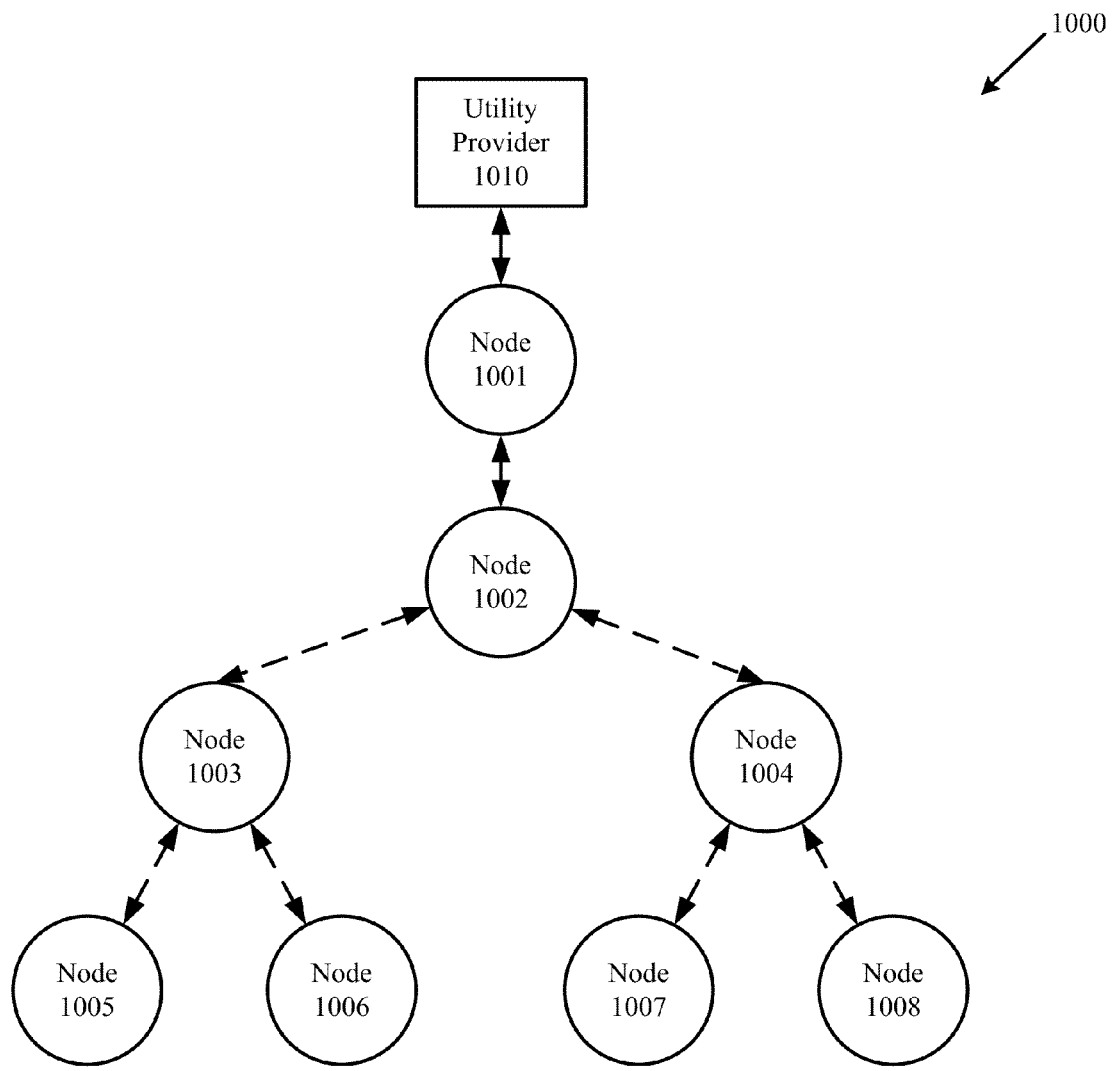
FIG. 10 is a block diagram of a simple network infrastructure stemming from a utility provider having a plurality of nodes in accord with one embodiment of the present disclosure.

FIG. 10 depicts a block diagram of a simple network infrastructure stemming from utility provider 1010 having a plurality of nodes 1001, 1002, 1003, 1004, 1005, 1006, 1007, 1008. In this configuration, node 1001 is a parent to node 1002; node 1002 is a parent to nodes 1003, 1004; node 1003 is a parent to nodes 1005, 1006; and node 1004 is a parent to nodes 1007, 1008. The following are examples of some common actions which may be performed within a network implementing the systems and methods disclosed herein. As these are merely examples, they are not intended to be limiting. As persons of ordinary skill in the art will recognize, other configurations may be possible or otherwise advantageous.

Node Swap

In this example, node 1002 has stopped functioning and needed to be replaced by a technician. When new node 1002 is placed into the network, its sysClock may not be in synchronization with the rest of the network. Depending on the amount of time that node 1002 was out of service, it is also possible that the sysClocks of node 1002's children (nodes 1003, 1004) as well as their respective children are no longer in synchronization with one another or with node 1001.

At the time when the new node 1002 is installed, it is not configured with node 1001 as its parent. Therefore, new node 1002 accepts timesync information from any node. In this way, the device can be configured from utility provider 1010 through the network or locally using a field radio. Either way it is configured, it is assumed that the timesync that the child device receives will be in synchronization with the network time and, therefore, in synchronization with the sysClock of node 1001.

Nodes 1003 and 1004 may also need to update their parents also. In one embodiment, this could be accomplished through a system message from utility provider 1010 routed through nodes 1001 and 1002. In another embodiment, this may be accomplished through a message routed from a field radio through new node 1002. In either case, new node 1002 may perform a hunting procedure as described above to connect to its children (nodes 1003 and 1004). In the case of node 1003, as soon as the hunt is successful, node 1003 receives timesync information from node 1002, its parent. If the time shift is substantial, node 1003 enters into super sniffing mode, as disclosed herein, which enables its children (nodes 1005 and 1006) to continue to connect to it. The same will happen when node 1004 is hunted. Nodes 1005, 1006, 1007, and 1008 will all get the new timesync on their next upload. This procedure ensures that, upon completion of replacing node 1002 with new node 1002, all nodes should be able to upload virtually immediately.

Extended Outage Recovery

In this example, node 1002 in the sample network shown in FIG. 10 is unable to communicate with any other node in the system for a period of time. At the time that node 1002 recovers, its sysClock may not be in synchronization with the rest of the network. It is also possible that, if the node was out for an extended period of time (for example, more than 10 days), nodes 1003 and 1004 and their respective children are also out of timesync relative to node 1001. When this occurs, if node 1002 has a hunting delay set to zero, then node 1002 requires assistance from an external device in order to rejoin the network. However, if node 1002 has a hunting interval set (not to zero), then node 1002 attempts a hunting procedure to connect with its primary parent (in this example, node 1001) at it programmed interval. If the fault is clear, the hunting procedure results in node 1002 receiving a valid timesync from its primary parent (node 1001). This terminates the extended outage and clears the corresponding error. Node 1002 then begins its normal uploading procedure.

If node 1002 was out for less than the expected period of time (for example, 10 days or less), the hunting procedure is not necessary because the sysClock of nodes 1001 and 1002 are aligned sufficiently to enable a normal hailing procedure between the nodes to establish connection when necessary. As soon as node 1002 re-connects to node 1001, node 1002 receives an updated timesync from node 1001. If the new timesync causes a significant time shift (for example, a time shift greater than 7 seconds), node 1002 enters super sniffing mode (i.e., node 1002 begins sampling all of its hailing channels for an extended period of time).

This same process occurs between node 2 and its children (nodes 1003 and 1004). Since the children of nodes 1003 and 1004 (nodes 1005,1006, 1007, and 1008 respectively) did not experience a loss of connection to their parents, these nodes are not in the extended outage mode and use the normal hailing procedure to upload data messages, as disclosed herein. If the time shift passed from node 1002 to its child nodes is small (for example, 1-2 seconds), then the child nodes' sysClocks may be aligned closely enough for the nodes to connect without issue (i.e., the nodes may continue to use the normal hailing procedures). However, if the time shift is large (for example, more than 10 seconds), then node 1002 samples all of its hailing channels. Again, the child nodes have no trouble connecting and uploading their data. All nodes in the network should be able to upload their data as soon as the outage clears.

Dynamic Squelching

In one embodiment, it may be desirable to increase receiver sensitivity to reduce the effects of unwanted background noise on an RF device. However, doing so causes an increased drain on battery life. The present disclosure further provides a controlled method to balance battery life against receiver sensitivity. Generally, this is done by adjusting a "noise floor" to control the "false break rate" as described below. When the false break rate is increased, the sensitivity increases but the battery life decreases. Conversely, when the false break rate is decreased, the sensitivity decreases but the battery life increases.

Background noise may come from many sources such as cordless telephones, baby monitors, garage door opening devices, and any device operating on the RF spectrum. Background noise varies depending on the frequency/channel. The "noise floor" and the "break level" should therefore be maintained for each channel separately. The method of the present disclosure further minimizes the number of false breaks due to transient interferers, which are noise sources present for a relatively short period of time. These transient interferers cause the measured radio frequency power on a particular channel to increase above the noise floor. An example of a transient interferer is a cordless phone, which may be in use for shorts durations of a few minutes to an hour or so at different and variable times. The break level described herein quickly adjusts to eliminate this interferer from causing excessive "false breaks" on the RF devices of the present disclosure. As soon as the interfering device has ceased causing interference on a particular channel/frequency (e.g., the cordless telephone is no longer active because a call has ended), the method of the present disclosure returns the RF devices to the desired sensitivity level or noise floor.

Figure 11:
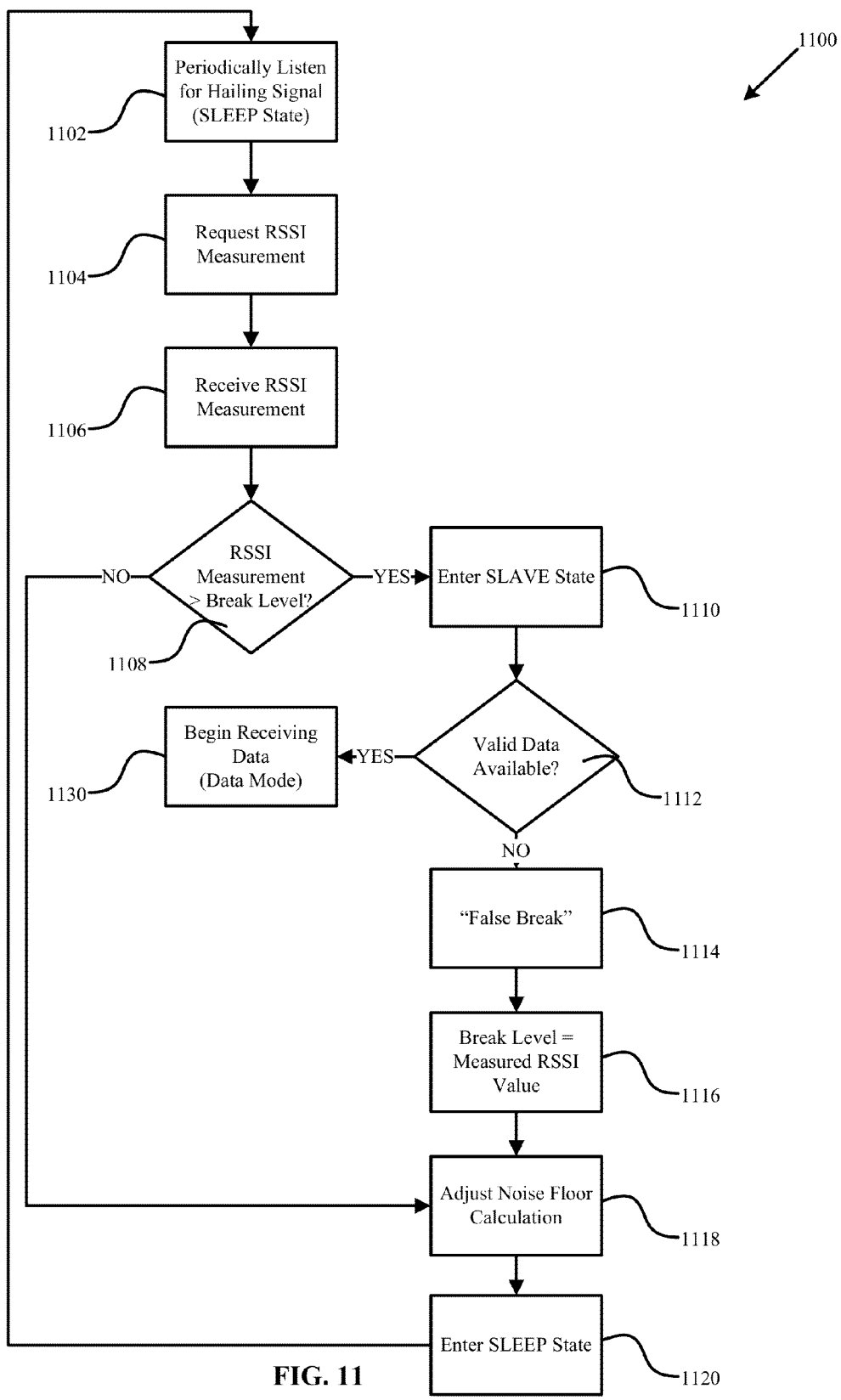
FIG. 11 is a flow diagram of a dynamic squelching method used in RF devices in accord with one embodiment of the present disclosure.

As shown in FIG. 11 depicting the dynamic squelching method 1100, battery-operated radio frequency devices periodically wake up and listen on one or more hailing channels while in SLEEP state (block 1102). While attempting to detect a hailing signal on a selected hailing channel, the microprocessor of the RF device requests a Receive Signal Strength Indicator (RSSI) measurement from the RF device's chip set for the selected hailing channel (block 1104). The RSSI measurement is an indication of how much energy is present in the selected hailing channel. One RSSI measurement is requested for each currently-monitored hailing channel, which in a preferred embodiment may be two channels selected from the hailing channel frequency set but may be a different number of channels in other embodiments as recognized by those of ordinary skill in the art.

A device fully awakens (i.e., the device enters SLAVE state to listen for a data communication from a MASTER state device) whenever the reported RSSI measurement exceeds the calculated break level (blocks 1106 and 1108). A "false break" occurs when a device fully awakens (i.e., enters SLAVE state) (block 1110) due to the reported RSSI measurement on a particular hailing channel, but there is no actual network traffic (i.e., no data to receive) on that particular hailing channel (i.e., no MASTER state device is attempting a data transmission to or requesting information from the SLAVE state device) (block 1112). In this case, a "false break" occurs (block 1114). False breaks are mainly caused by background noise existing in the environment around the RF devices of the present disclosure. Following a false break, the RF device returns to SLEEP state.

In one embodiment, if the RSSI measurement is lower than the break level for a certain number of times (or cycles through the hailing process), the noise floor calculation may be adjusted downwardly at block 1118.

The RSSI measurements are used to calculate a noise floor level and a break level for each hailing channel. The number of RSSI measurements required for each RF device depends on the total number of hailing channels used. In a preferred embodiment having 50 hailing channels in the hailing channel frequency set, a total of 50 measurements are necessary. In one embodiment, the noise floor level and the break level are maintained in the RF device's memory for each hailing channel, even when a channel is not actively being sampled.

The "noise floor" is based on the RSSI value measured for a particular channel. The RF device's microprocessor slowly adjusts the noise floor setting to achieve a programmable ratio of false breaks to the total number of times that the device checked to see if it was being hailed. Since the number of hailing attempts performed each day is known based on the system timing described herein, the ratio of false breaks to total hailing attempts can also be converted to a number of false breaks per day. The purpose of the noise floor is to maintain maximum sensitivity to incoming RF signals while concurrently minimizing the battery drain due to processing false wakes caused by background noise interference. In a preferred embodiment of the present disclosure, a default noise floor ratio of approximately 800 false breaks per day is desirable. However, in other embodiments, a different default noise floor ratio may be desirable. If the noise floor is set too low, the RF device receives too many false breaks and wastes battery life by processing them unnecessarily. Conversely, if the noise floor is set too high, valid communications sent by a MASTER state device may be ignored because an RF device may not have enough power to exceed the noise floor level, effectively reducing the communication range between devices.

During the hailing and dynamic squelching process (as shown in FIG. 11), the RSSI measurement is compared to a break level (i.e., a "squelch level") for the associated hailing channel (block 1108). If the RSSI measurement is above the break level, then the unit fully awakens and attempts to process an incoming data message from a device in MASTER state (block 1130). If no data message is being sent, then the action is declared a false break (block 1114). The current break level for that channel is then set to the measured RSSI value (block 1116), and the noise floor calculation is adjusted (1118). The device then enters SLEEP state and resumes the hailing and dynamic squelching procedure disclosed herein (block 1120). This prevents short-term interferers that cause an RSSI measurement above the noise floor from causing multiple false breaks.

If a valid message is received (blocks 1112 and 1130), no changes are made to the break level or noise floor. If the measured RSSI value is equal to or below the break level but above the noise floor value for the channel, no changes are made to the break level. Only when the measured RSSI is below noise floor level for the channel is the break level adjusted down to equal the noise floor level for a channel.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A radio frequency (RF) apparatus for sending and receiving wireless communications, the RF apparatus comprising:
    an oscillator;
    a memory storing a hailing channel frequency set and a data channel frequency set, the hailing channel frequency set comprising a plurality of hailing channels and the data channel frequency set comprising a plurality of data channels;
    an antenna operatively connected to the microprocessor; and
    a microprocessor operatively connected to the oscillator, the memory and the antenna, the microprocessor configured to:
    determine a system time based on the oscillator;
    transmit and receive via the antenna a hailing signal on at least one of the plurality of hailing channels;
    transmit and receive via the antenna data on at least one of the plurality of data channels.

2. The RF apparatus of claim 1, wherein the microprocessor is further configured to select the at least one of the plurality of hailing channels from the hailing channel frequency set, the selection depending on a last known hailing channel.

3. The RF apparatus of claim 1, wherein the microprocessor is further configured to select the at least one of the plurality of data channels from the data channel frequency set, the selection depending on the system time and a node identification.

4. The RF apparatus of claim 1, wherein the microprocessor is further configured to:
    receive a new system time from a second RF device; and
    send the new system time to at least a third RF device.

5. The RF apparatus of claim 1, wherein the microprocessor is further configured to receive a new system time from the Internet.

* * * * *